United States Patent
Nuggehalli et al.

(10) Patent No.: US 9,699,811 B2
(45) Date of Patent: Jul. 4, 2017

(54) APPARATUS AND METHOD FOR RANDOM ACCESS WITH MULTIPLE ANTENNAS IN A WIRELESS NETWORK

(71) Applicant: Samsung Electronics Co., Ltd., Gyeonggi-do (KR)

(72) Inventors: Pavan Nuggehalli, Mountain View, CA (US); Ying Li, Richardson, TX (US); Zhouyue Pi, Allen, TX (US); Richard Stirling-Gallacher, Dallas, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 13/833,065

(22) Filed: Mar. 15, 2013

(65) Prior Publication Data

US 2014/0016573 A1   Jan. 16, 2014

Related U.S. Application Data

(60) Provisional application No. 61/670,925, filed on Jul. 12, 2012.

(51) Int. Cl.
*H04W 74/08*   (2009.01)
*H01Q 1/24*   (2006.01)
(Continued)

(52) U.S. Cl.
CPC ........ *H04W 74/0833* (2013.01); *H01Q 1/242* (2013.01); *H01Q 1/246* (2013.01);
(Continued)

(58) Field of Classification Search
CPC .......... H01Q 1/242; H01Q 1/246; H01Q 3/36; H04B 7/0617; H04W 74/0833; H04W 52/42; H04W 74/08
(Continued)

(56) References Cited

U.S. PATENT DOCUMENTS

2003/0133426 A1   7/2003   Schein et al.
2004/0082356 A1   4/2004   Walton et al.
(Continued)

FOREIGN PATENT DOCUMENTS

WO   WO 2007/058494 A1   5/2007
WO   WO 2007/120019 A1   10/2007

OTHER PUBLICATIONS

International Search Report dated Oct. 31, 2013 in connection with International Patent Application No. PCT/KR2013/006180, 4 pages.
(Continued)

*Primary Examiner* — Ricky Ngo
*Assistant Examiner* — Richard Chang

(57) ABSTRACT

A base station enables a mobile station to employ a random access retransmission scheme in a wireless communication network. The mobile station includes a plurality of antennas configured to communicate with the base station. The mobile station also includes a processing circuitry coupled to the plurality of antennas. The processing circuitry is configured to perform a random access during a random access channel (RACH) burst. The processing circuitry also is configured to at least one of: transmit a random access signal with at least one of an initial transmit power level and an initial transmit beamwidth, and, in response to a random access attempt failure, change at least one of a transmit (Tx) power level and a Tx beamwidth and retransmit the random access signal.

18 Claims, 15 Drawing Sheets

(51) Int. Cl.
*H01Q 3/36* (2006.01)
*H04B 7/06* (2006.01)
*H04W 52/42* (2009.01)

(52) U.S. Cl.
CPC ............. *H01Q 3/36* (2013.01); *H04B 7/0617* (2013.01); *H04W 52/42* (2013.01); *H04W 74/08* (2013.01)

(58) Field of Classification Search
USPC .................................................. 370/328, 329
See application file for complete search history.

(56) References Cited

U.S. PATENT DOCUMENTS

| | | | |
|---|---|---|---|
| 2009/0175161 A1* | 7/2009 | Yi et al. ........................ | 370/210 |
| 2010/0041428 A1 | 2/2010 | Chen et al. | |
| 2011/0039499 A1 | 2/2011 | Zhang et al. | |
| 2011/0212720 A1* | 9/2011 | Hamalainen ........ | H04L 41/0677 455/423 |
| 2011/0268049 A1 | 11/2011 | Luo et al. | |
| 2012/0076031 A1 | 3/2012 | Zeira | |
| 2012/0149422 A1 | 6/2012 | Ye et al. | |
| 2012/0281548 A1* | 11/2012 | Lin ....................... | H04W 36/30 370/242 |
| 2013/0153298 A1* | 6/2013 | Pietraski ................ | G01V 11/00 175/45 |

OTHER PUBLICATIONS

Written Opinion of International Searching Authority dated Oct. 31, 2013 in connection with International Patent Application No. PCT/KR2013/006180, 5 pages.

European Search Report issued for EP 13815971.0 with mailing date of Dec. 1, 2015, 8 pgs.

* cited by examiner

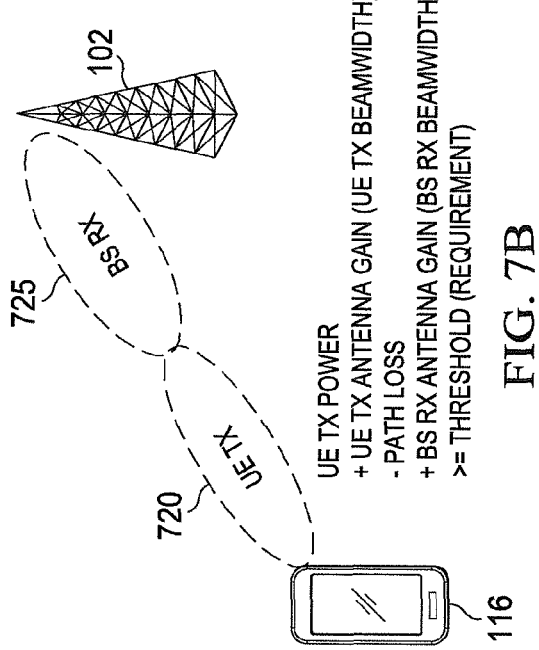
FIG. 7A
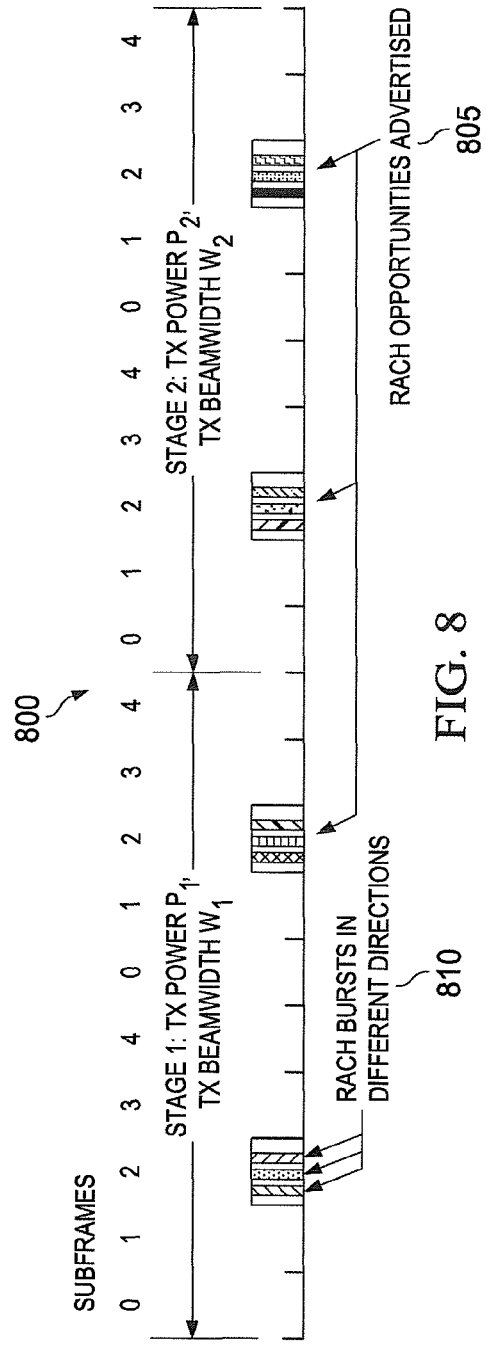
FIG. 7B
FIG. 8

APPARATUS AND METHOD FOR RANDOM ACCESS WITH MULTIPLE ANTENNAS IN A WIRELESS NETWORK

CROSS-REFERENCE TO RELATED APPLICATION(S) AND CLAIM OF PRIORITY

The present application claims priority to U.S. Provisional Patent Application Ser. No. 61/670,925 filed Jul. 12, 2012, entitled "RANDOM ACCESS WITH MULTIPLE ANTENNAS". The content of the above-identified patent documents is incorporated herein by reference.

TECHNICAL FIELD

The present application relates generally to wireless communications and, more specifically, to a system and method for performing random access using multiple antennas.

BACKGROUND

It is anticipated that the next generation of mobile broadband communication systems (5G) will need to deliver 100-1000 times more capacity than current 4G systems, such as Long Term Evolution (LTE) and Worldwide Interoperability for Microwave Access (WiMAX), to meet the expected growth in mobile traffic. Existing approaches to increase spectral efficiency are unlikely to meet this explosive demand in wireless data. Current 4G systems use a variety of advanced techniques including Orthogonal Frequency Division Multiplexing (OFDM), Multiple Input Multiple Output (MIMO), multi-user diversity, spatial division multiple access (SDMA), higher order modulation and advanced coding, and link adaptation to virtually eliminate the difference between theoretical limits and practical achievements. Accordingly, newer techniques like carrier aggregation, higher order MIMO, Coordinated MultiPoint (CoMP) transmission, and relays are expected to provide only modest improvement in spectral efficiency. One strategy for increasing system capacity that has worked well in the past is the use of smaller cells. However, the capital and operating costs required to acquire, install, and maintain a large number of cells can be challenging since a 1000 fold increase in capacity would, in theory, entail a 1000 fold increase in the number of cells deployed. Moreover as the cell size shrinks, there is a need to perform frequent handovers that increase network signaling overhead and latency.

SUMMARY

A mobile station is provided. The mobile station includes a plurality of antennas configured to communicate with at least one base station. The mobile station also includes a processing circuitry coupled to the plurality of antennas. The processing circuitry is configured to perform a random access during a random access channel (RACH) burst. The processing circuitry also is configured to at least one of: transmit a random access signal with at least one of an initial transmit power level and an initial transmit beamwidth, and, in response to a random access attempt failure, change at least one of a transmit (Tx) power level and a Tx beamwidth and retransmit the random access signal.

A method is provided. The method includes attempting, by a mobile station, a random access of at least one base station, during a random access channel (RACH) burst. The method also includes at least one of: transmitting a random access signal with at least one of an initial transmit power level and an initial transmit beamwidth, and in response to a random access attempt failure, changing at least one of a transmit (Tx) power level and a Tx beamwidth and retransmitting the random access signal.

A base station is provided. The base station includes a plurality of antenna configured to communicate with at least one mobile station. The base station also includes processing circuitry coupled to the plurality of antennas. The processing circuitry is configured to enable the at least one mobile station to perform a random access during a random access channel (RACH) burst. The at least one mobile station is configured to at least one of: transmit a random access signal with at least one of an initial transmit power level and an initial transmit beamwidth, and, in response to a random access attempt failure, change at least one of a transmit (Tx) power level and a Tx beamwidth and retransmit the random access signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7A illustrates random access resource configurations according to embodiments of the present disclosure;

FIG. 7B illustrates an uplink communication according to embodiments of the present disclosure;

FIG. 8 illustrates staged random access retransmissions according to embodiments of the present disclosure;

DETAILED DESCRIPTION

Figure 1:
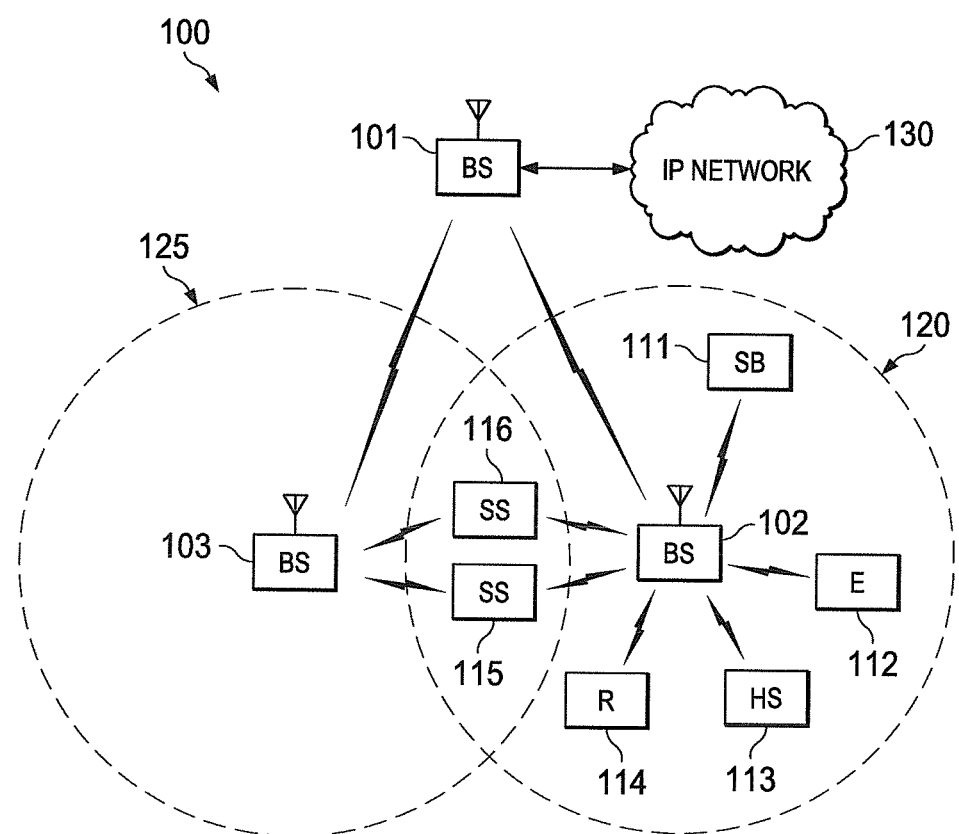
FIG. 1 illustrates a wireless network according to an embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: Z. Pi and F. Khan, "An introduction to millimeter-wave mobile broadband systems," *IEEE Communications Magazine*, June 2011 (REF 1), Z. Pi and F. Khan, "System design and network architecture for a millimeter-wave mobile broadband (MMB) system," in Proc. Sarnoff Symposium, 2011 (REF 2); and 3GPP TS 36.221, "Evolved Universal Terrestrial Radio Access (E-UTRA); Medium Access Control (MAC) protocol specification," Release 10, 2012 (REF 3).

One proposal for next generation mobile communication (5G) is a millimeter-wave mobile broadband (MMB) system that advocates the use of large amounts of untapped spectrum in the 3-300 GHz range [1,2]. A primary obstacle to successful operation at such high frequencies is the harsh propagation environment. Millimeter wave signals do not penetrate solid matter very well and are severely absorbed by foliage and rain. Alternatively, at higher frequencies, the antennas used in base station (BS) and mobile devices can be made smaller, allowing a large number of antennas (sometimes referred to as massive MIMO) to be packed into a compact area. The availability of large number of antennas bestows the ability to achieve high gain using transmit and/or receive beamforming, which can be employed to combat propagation path loss. With a large number of antennas, it also becomes possible to spatially separate downlink and uplink transmissions between the ES and multiple mobile devices, thus reaping the power of space division multiple access to increase system capacity. For example, the wavelength of a broadband communication system at six gigahertz (GHz) is just five centimeters (cm), allowing the placement of a 64-element antenna array at the mobile station (MS) with a reasonable form-factor. Such an MS can easily form a large number of beam patterns for uplink transmission and downlink reception with different levels of directional gain. With progress in antenna technology and the use of higher frequencies, it will become feasible to form even larger number of beam patterns with higher levels of directivity.

The design of a random access mechanism for a system employing multiple antennas at both the BS and MSs offers both challenges and opportunities. The MS and BS can receive random access messages using different combination of Tx (transmit) and receive (Rx) beams to ensure sufficient coverage. Since random access in cellular systems typically has tight delay requirements (usually several tens of milliseconds), an efficient procedure for determining suitable Rx-Tx pair(s) is required. In some situations where channel reciprocity holds (e.g., TDD), an MS may be able to rely on downlink Tx beam measurements to identify a suitable uplink Tx beam. However such an assumption is not reliable in many other situations. For example, in an FDD system, or when the MS uses separate digital chains for Tx and Rx. Even in TDD systems, an MS moving at high speed may not be able to rely on downlink measurements to form uplink Tx beams.

The MS also needs to select the kind of beam to use for sending random messages. In particular, an MS with multiple antennas can deploy beams of different width expressed, for example, in terms of half power beamwidth (HPBW). If the MS employs narrow beams, then the ES may be able to spatially separate transmissions from different MSs and reduce the frequency of collisions between competing MSs. Alternatively, an MS using narrow beams will need to attempt transmissions in multiple spatial directions to ensure successful reception, increasing the latency associated with the random access procedure. The MS can reduce the latency associated with the search procedure by using wider beams as long as sufficient directional gain to satisfy uplink coverage requirements is met. A disadvantage of using wide beams is that uplink transmissions from different MSs are more likely to interfere, increasing the probability of collision and impacting random access performance. A suitable choice of beamwidth is likely to be a complex function of the number of MSs in a cell, their geographic distribution, transmit power capability, and beamforming capability.

In traditional random access design, such as in LTE (e.g., as described in REF 3) or WiMAX, MSs can be configured to ramp up the power of their transmission after detecting a random access failure. With multiple antennas, it also becomes possible to exploit spatial degrees of freedom. For example, an MS may deploy narrower beams with higher directional gain in successive retransmission attempts. A retransmission mechanism that combines power ramping with beamwidth selection needs to be devised FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes a base sta eNodeB (eND) 101, eNB 102, and eNB 103. The eNB 101 communicates with eNB 102 and eNB 103. The eNB 101 also communicates with Internet protocol (IP) network 130, such as the Internet, proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term "user equipment" or "UE" is used herein to designate any remote wireless equipment that wirelessly accesses an eNB and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using 5G, LTE, LTE-A, or WiMAX techniques including techniques for: random access using multiple antennas as described in embodiments of the present disclosure.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2A:
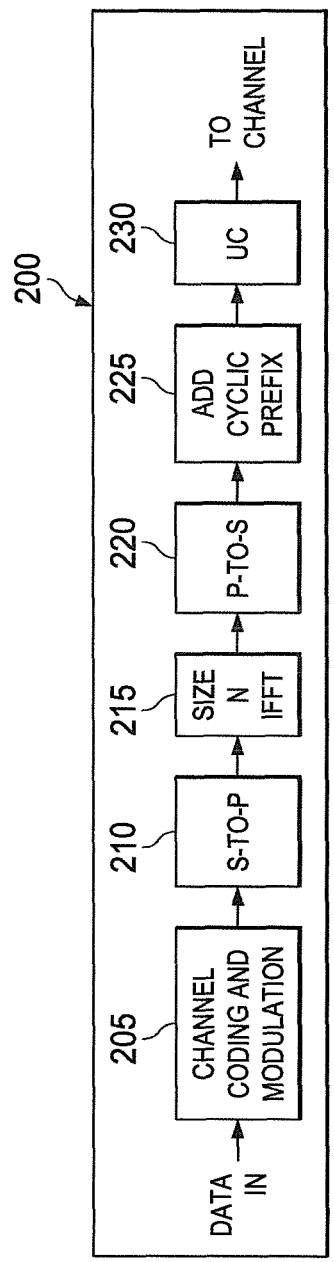
FIG. 2A illustrates a high-level diagram of a wireless transmit path according to an embodiment of this disclosure.
Figure 2B:
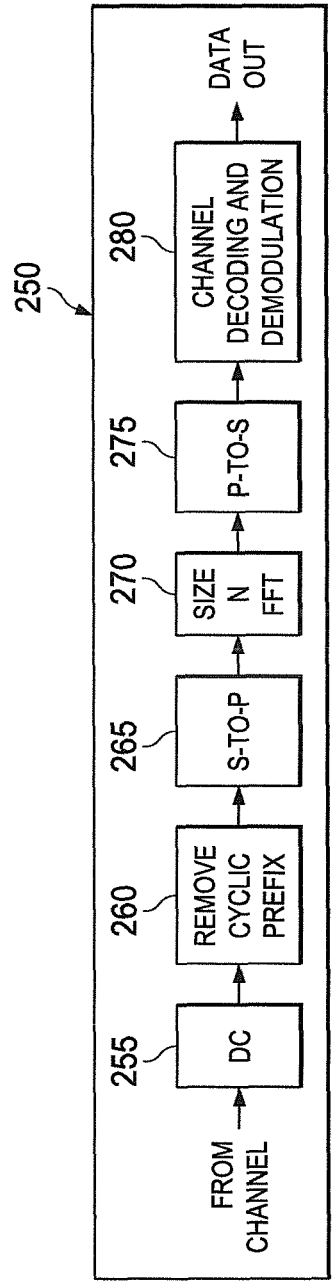
FIG. 2B illustrates a high-level diagram of a wireless receive path according to an embodiment of this disclosure.

FIG. 2A is a high-level diagram of a wireless transmit path. FIG. 2B is a high-level diagram of a wireless receive path. In FIGS. 2A and 2B, the transmit path 200 may be implemented, e.g., in eNB 102 and the receive path 250 may be implemented, e.g., in a UE, such as UE 116 of FIG. 1. It will be understood, however, that the receive path 250 could be implemented in an eNB (e.g. eNB 102 of FIG. 1) and the transmit path 200 could be implemented in a UE. In certain embodiments, transmit path 200 and receive path 250 are configured to perform methods for random access using multiple antennas as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 3:
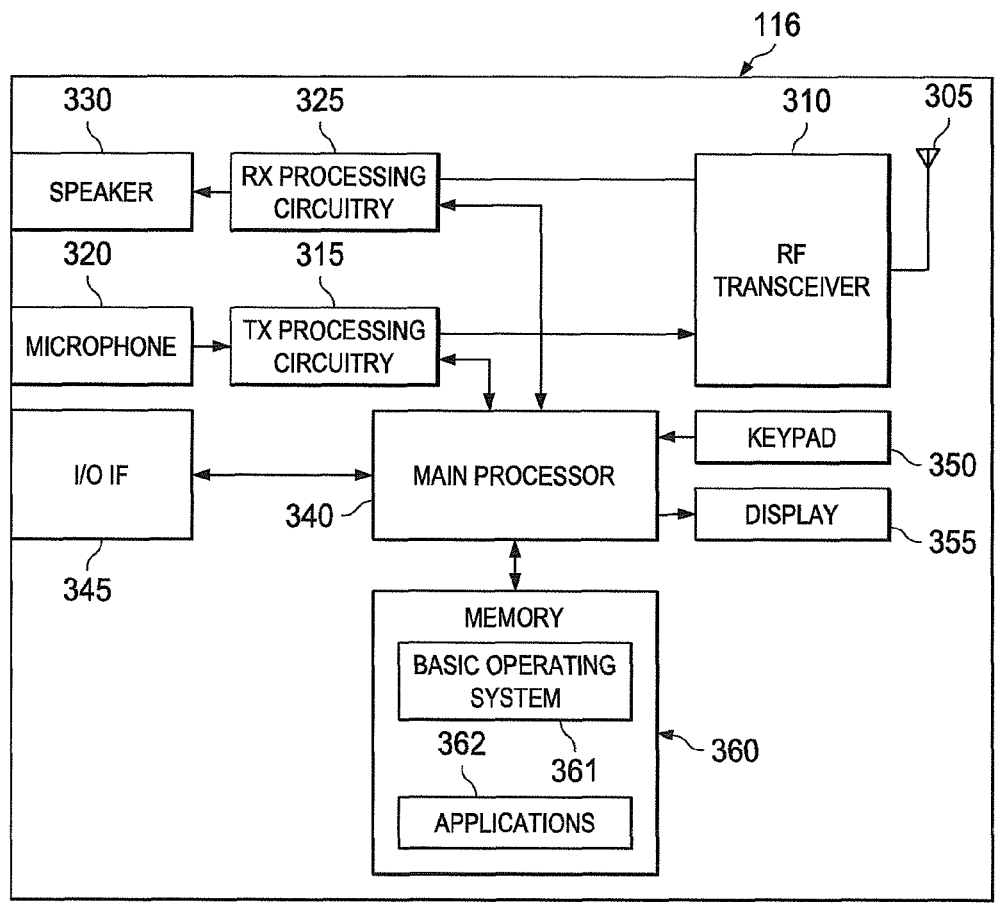
FIG. 3 illustrates a subscriber station according to an exemplary embodiment of the disclosure.

FIG. 3 illustrates a subscriber station according to embodiments of the present disclosure. The embodiment of subscribe station, such as UE 116, illustrated in FIG. 3 is for illustration only. Other embodiments of the wireless subscriber station could be used without departing from the scope of this disclosure.

UE 116 comprises antenna 305, radio frequency (RF) transceiver 310, transmit (TX) processing circuitry 315, microphone 320, and receive (RX) processing circuitry 325. Although shown as a single antenna, antenna 305 can include multiple antennas. SS 116 also comprises speaker 330, main processor 340, input/output (I/O) interface (IF) 345, keypad 350, display 355, and memory 360. Memory 360 further comprises basic operating system (OS) program 361 and a plurality of applications 362. The plurality of applications can include one or more of resource mapping tables (Tables 1-10 described in further detail herein below).

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360, such as operations for performing random access using multiple antennas as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Embodiments of the present disclosure provide methods and apparatus to perform random access in a system where both the BS and MSs have access to multiple antennas. For the purpose of illustration, embodiments of the present disclosure use the term beamwidth to distinguish the spatial signature of the different kind of beams that can be formed for transmission and reception. The term beamwidth should be construed to include other possible descriptions of beam patterns including, for example, codebooks (of possibly different sizes) and directional gain associated with a particular beam pattern.

Figure 4:
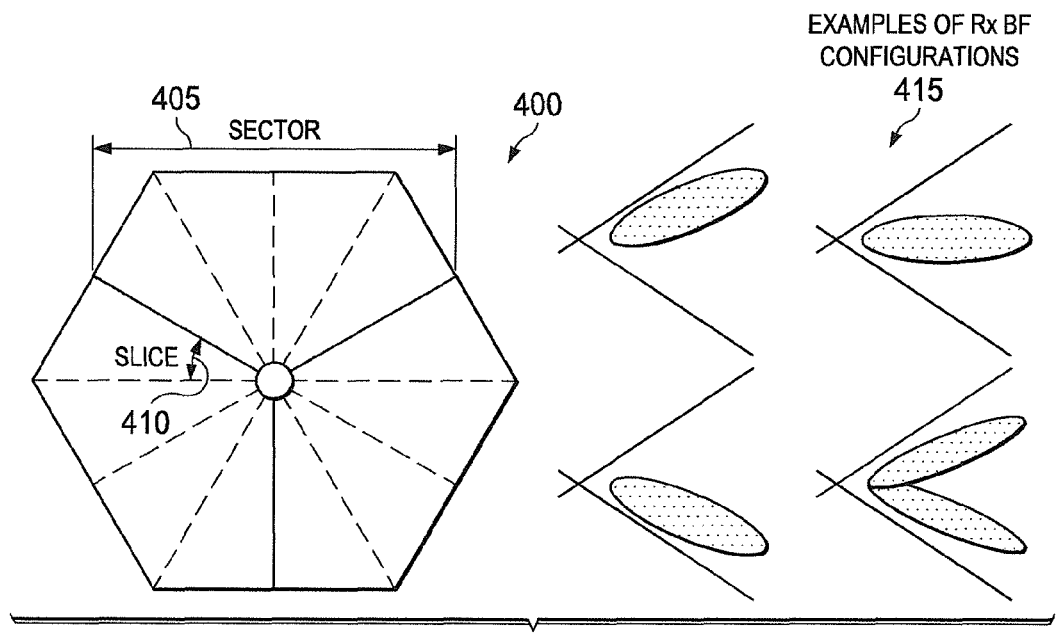
FIG. 4 illustrates an example system architecture for beamforming according to embodiments of the present disclosure.

FIG. 4 illustrates an example system architecture for beamforming according to embodiments of the present disclosure. The embodiment of the system architecture shown in FIG. 4 is for illustration only. Other embodiments could be used without departing from the scope of this disclosure.

A BS can serve one or more cells. In the example shown in FIG. 4, a cell 400 is divided into three sectors 405 (further denoted by the solid lines), each covering 120° in the azimuth. A sector 405 can be further subdivided into slices 41Q to manage intra-sector mobility. A BS can be configured to receive random access messages on a cell 400, sector 405, or slice 410 level. A BS can employ multiple Rx beamforming configurations 415 to receive random access messages. The Rx beamforming configuration 415 can involve receiving signals in one or more directions and involve a particular selection of beamwidth. A particular Rx beamforming configuration 415 can involve one or more digital chains.

In various embodiments of the present disclosure, a BS can have one or multiple cells, and each cell can have one or multiple antenna arrays, where each array within a cell can have different frame structures, (e.g., different uplink and downlink ratios in a time division duplex (TDD) system). Multiple TX/RX (transmitting/receiving) chains can be applied in one array or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted, e.g., in wide beams. A wide beam may include a single wide beam transmitted at one time or a sweep of narrow beams at sequential times. Multicast and unicast data and control signals and messages can be transmitted, e.g., in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages and broadcast data channels and control channels can be transmitted, e.g., in wide beams. Multicast and unicast data and control signals and messages can be transmitted, e.g., in narrow beams.

The beams can be in various shapes or can have various beam patterns. The beam shapes or the beam patterns can be regular or irregular, e.g., pencil beam shape, cone beam shape, irregular main lobe with side lobes, and the like. The beams can be formed, transmitted, received, using, e.g., the transmit paths and the receive paths in FIGS. 5A through 5D. For example, the transmit paths and the receive paths in FIGS. 5A through 5D can be located in transceivers of wireless communication devices at different points in a wireless communication (e.g., transmit paths and receive paths in one or more of the base stations 101-103 or the mobile stations 111-116 in FIG. 1).

Figure 5A:
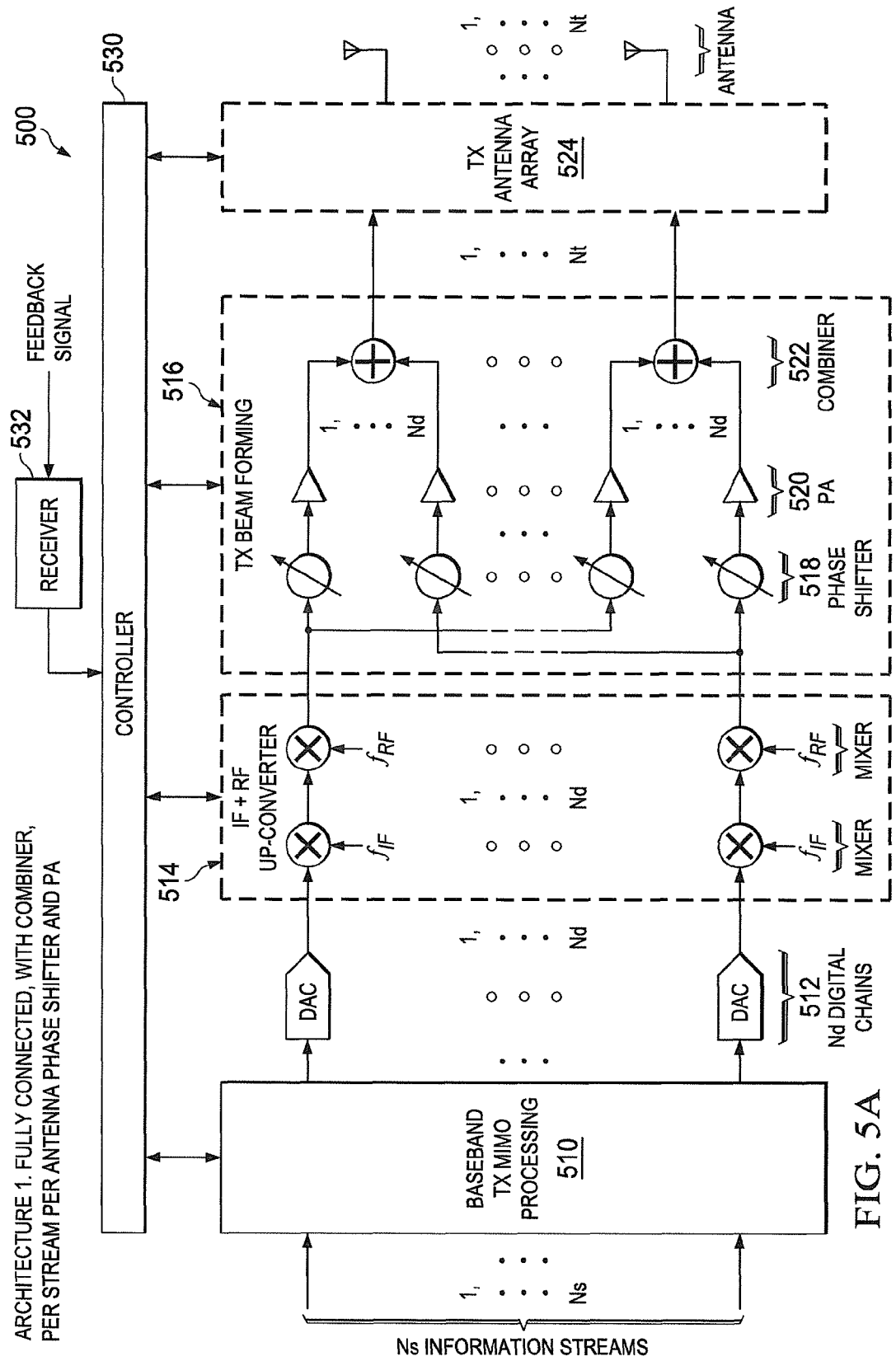
FIG. 5A illustrates a transmit path for multiple input multiple output (MIMO) baseband processing and analog beam forming with a large number of antennas, according to various embodiments of the present disclosure.

FIG. 5A illustrates a transmit path for multiple input multiple output (MIMO) baseband processing and analog beam forming with a large number of antennas, according to embodiments of this disclosure. The transmit path 500 includes a beam forming architecture in which all of the signals output from baseband processing are fully connected to all the phase shifters and power amplifiers (PAs) of the antenna array.

As shown in FIG. 5A, Ns information streams are processed by a baseband processor (not shown), and input to the baseband TX MIMO processing block 510. After the baseband TX MIMO processing, the information streams are converted at a digital and analog converter (DAC) 512 and further processed by an interim frequency (IF) and RF up-converter 514, which converts the baseband signal to the signal in RF carrier band. In some embodiments, one information stream can be split to I (in-phase) and Q (quadrature) signals for modulation. After the IF and RF up-converter 514, the signals are input to a TX beam forming module 516.

FIG. 5A shows one possible architecture for the TX beam forming module 516, where the signals are fully connected to all the phase shifters and power amplifiers (PAs) of the transmit antennas. Each of the signals from the IF and RF up-converter 514 can go through one phase shifter 518 and one PA 520, and via a combiner 522, all the signals can be combined to contribute to one of the antennas of the TX antenna array 524. In FIG. 5A, there are Nt transmit antennas in the TX antenna array 524. Each antenna can have one or multiple antenna elements. Each antenna transmits the signal over the air. A controller 530 can interact with the TX modules, including the baseband processor, IF and RF up-converter 514, TX beam forming module 516, and TX antenna array 524. A receiver module 532 can receive feedback signals, and the feedback signals can be input to the controller 530. The controller 530 can process the feedback signal and adjust the TX modules.

Figure 5B:
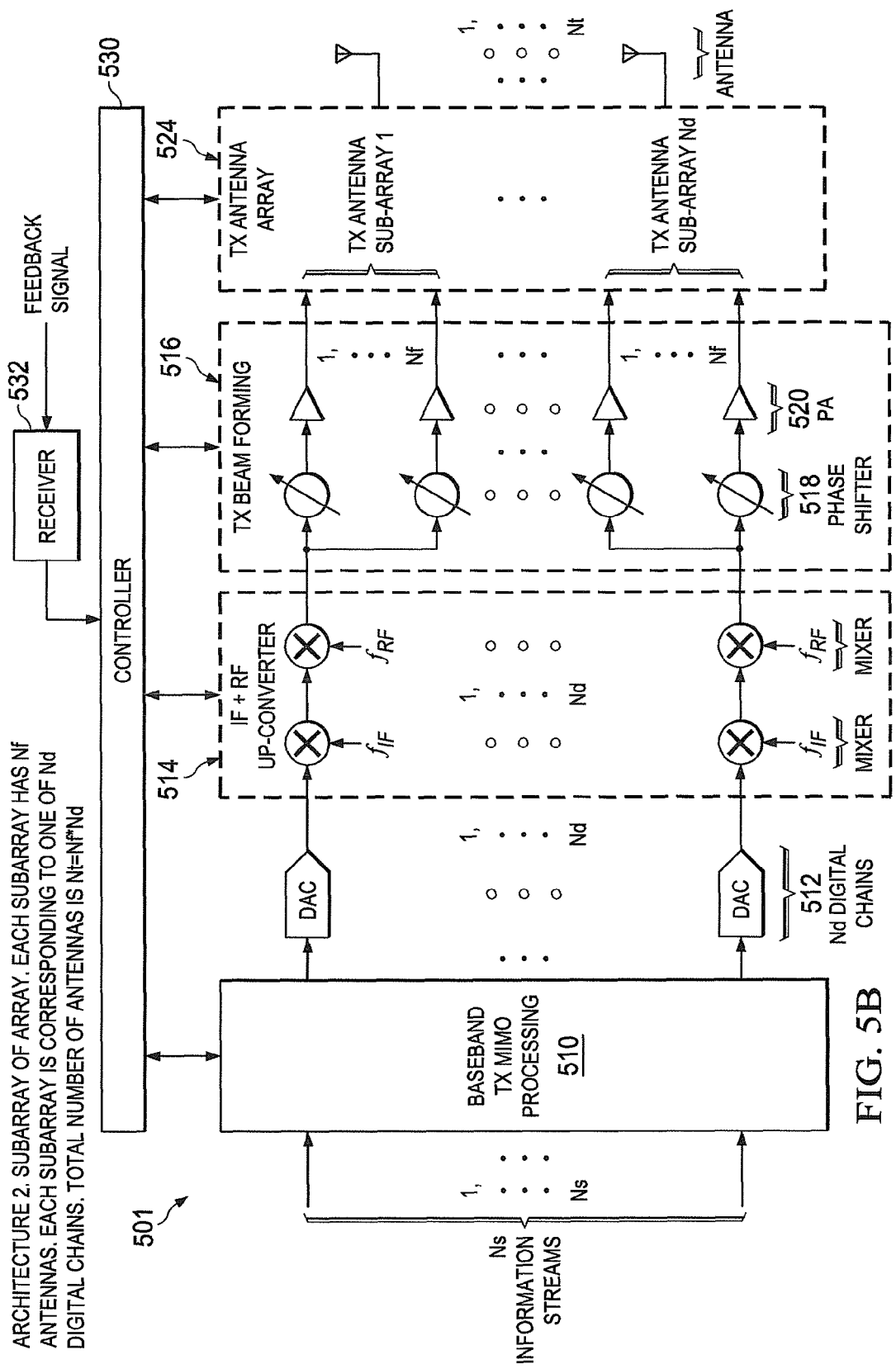
FIG. 5B illustrates another transmit path for MIMO baseband processing and analog beam forming with a large number of antennas, according to various embodiments of the present disclosure.

FIG. 5B illustrates another transmit path for MIMO baseband processing and analog beam forming with a large number of antennas, according to embodiments of this disclosure. The transmit path 501 includes a beam forming architecture in which a signal output from baseband processing is connected to the phase shifters and power amplifiers (PAs) of a sub-array of the antenna array. The transmit path 501 is similar to the transmit path 500 of FIG. 5A, except for differences in the TX beam forming module 516.

As shown in FIG. 5B, the signal from the baseband is processed through the IF and RF up-converter 514, and is input to the phase shifters 518 and power amplifiers 520 of a sub-array of the antenna array 524, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 501 includes an equal number of antennas for each sub-array. However, the disclosure is not limited thereto. Rather, the number of antennas for each sub-array need not be equal across all sub-arrays.

The transmit path 501 includes one output signal from the MIMO processing as the input to the RF processing with one sub-array of antennas. However, this disclosure is not limited thereto. Rather, one or multiple signals out of the Nd signals from baseband processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 5A, or any type of the RF and IF signal processing with an array of antennas. The process related to one sub-array of the antennas may be referred to as one "RF chain".

Figure 5C:
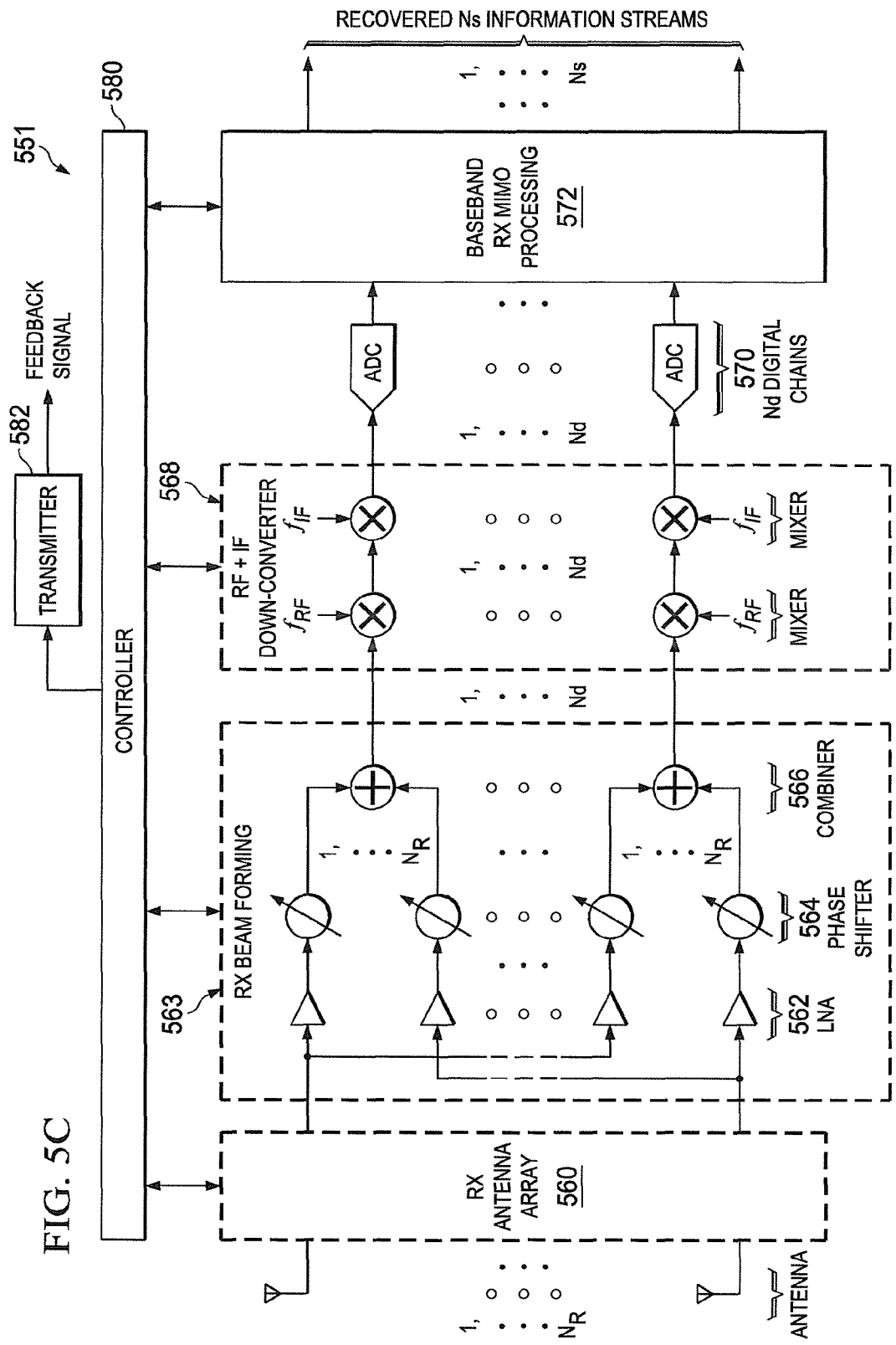
FIG. 5C illustrates a receive path for MIMO baseband processing and analog beam forming with a large number of antennas, according to various embodiments of the present disclosure.

FIG. 5C illustrates a receive path for MIMO baseband processing and analog beam forming with a large number of antennas, according to embodiments of this disclosure. The receive path 550 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 5C, NR receive antennas 560 receive the signals transmitted by the transmit antennas over the air. Each receive antenna can have one or multiple antenna elements. The signals from the RX antennas are processed through the LNAs 562 and the phase shifters 564. The signals are then combined at a combiner 566 to form an analog stream. In total, Nd analog streams can be formed. Each analog stream can be further converted to the baseband signal via an RF and IF down-converter 568 and an analog to digital converter (ADC) 570. The converted digital signals can be processed in a baseband RX MIMO processing module 572 and other baseband processing, to obtain the recovered NS information streams. A controller 580 can interact with the RX modules including the baseband processor, RF and IF down-converter 568, RX beam forming module 563, and RX antenna array module 560. The controller 580 can send signals to a transmitter module 582, which can send a feedback signal. The controller 580 can adjust the RX modules and determine and form the feedback signal.

Figure 5D:
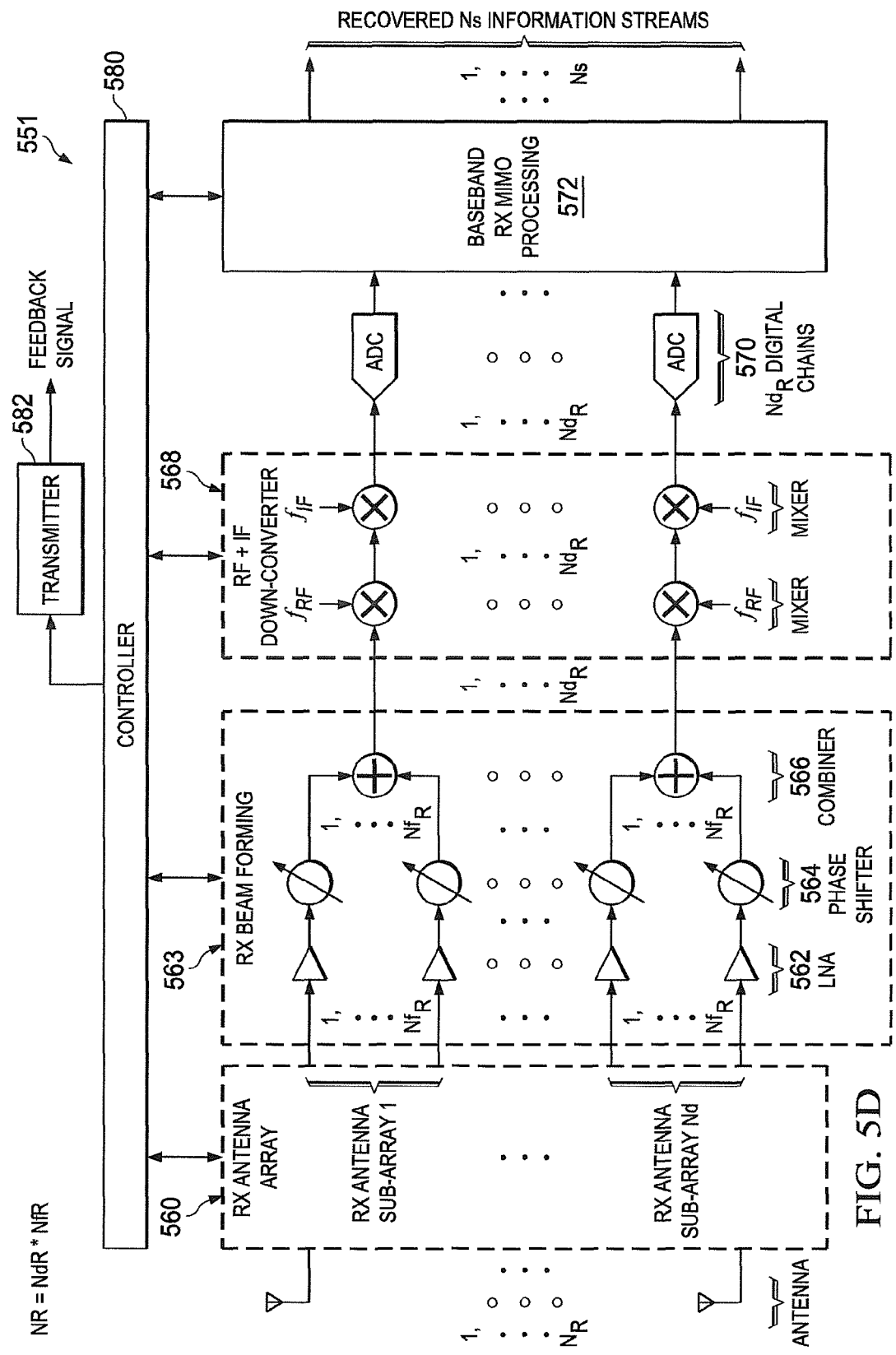
FIG. 5D illustrates another receive path for MIMO baseband processing and analog beam forming with a large number of antennas, according to various embodiments of the present disclosure.

FIG. 5D illustrates another receive path for MIMO baseband processing and analog beam forming with a large number of antennas, according to embodiments of this disclosure. The receive path 551 includes a beam forming architecture in which the signals received by a sub-array of the antenna array can be processed by amplifiers and phase shifters to form an analog stream that can be converted and processed in the baseband. The receive path 551 is similar to the receive path 550 of FIG. 5C, except for differences in the beam forming module 563.

As shown in FIG. 5D, the signals received by NfR antennas of a sub-array of the RX antenna array 560 are processed by the LNAs 562 and phase shifters 564, and are combined at combiners 566 to form an analog stream. There can be NdR sub-arrays (NdR=NR/NFR) with each sub-array forming one analog stream. Hence, in total, NdR analog streams can be formed. Each analog stream can be converted to the baseband signal via an RF and IF down-converter 568 and an ADC 570. The NdR digital signals are processed in the baseband module 572 to recover the Ns information streams. The receive path 551 includes an equal number of antennas for each sub-array. However, the disclosure is not limited thereto. Rather, the number of antennas for each sub-array need not be equal across all sub-arrays.

The receive path 551 includes one output signal from the RF processing with one sub-array of antennas, as one of the inputs to the baseband processing. However, this disclosure is not limited thereto. Rather, one or multiple output signals from the RF processing with one sub-array of antennas can be the inputs to the baseband processing. When multiple output signals from the RF processing with one sub-array of antennas are the inputs, each of the multiple output signals from the RF processing with one sub-array of antennas can be connected to part of or all of the antennas of the sub-array. For example, the RF and IF signal processing with each of the sub-array of antennas can be the same as the processing with the array of antennas as in FIG. 5C, or any type of the RF and IF signal processing with an array of antennas. The process related to one sub-array of the antennas can be referred to as one "RF processing chain".

In other embodiments, there can be other transmit and receive paths which are similar to the paths in FIGS. 5A through 5D, but with different beam forming structures. For example, the power amplifier 520 can be after the combiner 522, so the number of amplifiers can be reduced.

Figure 6:
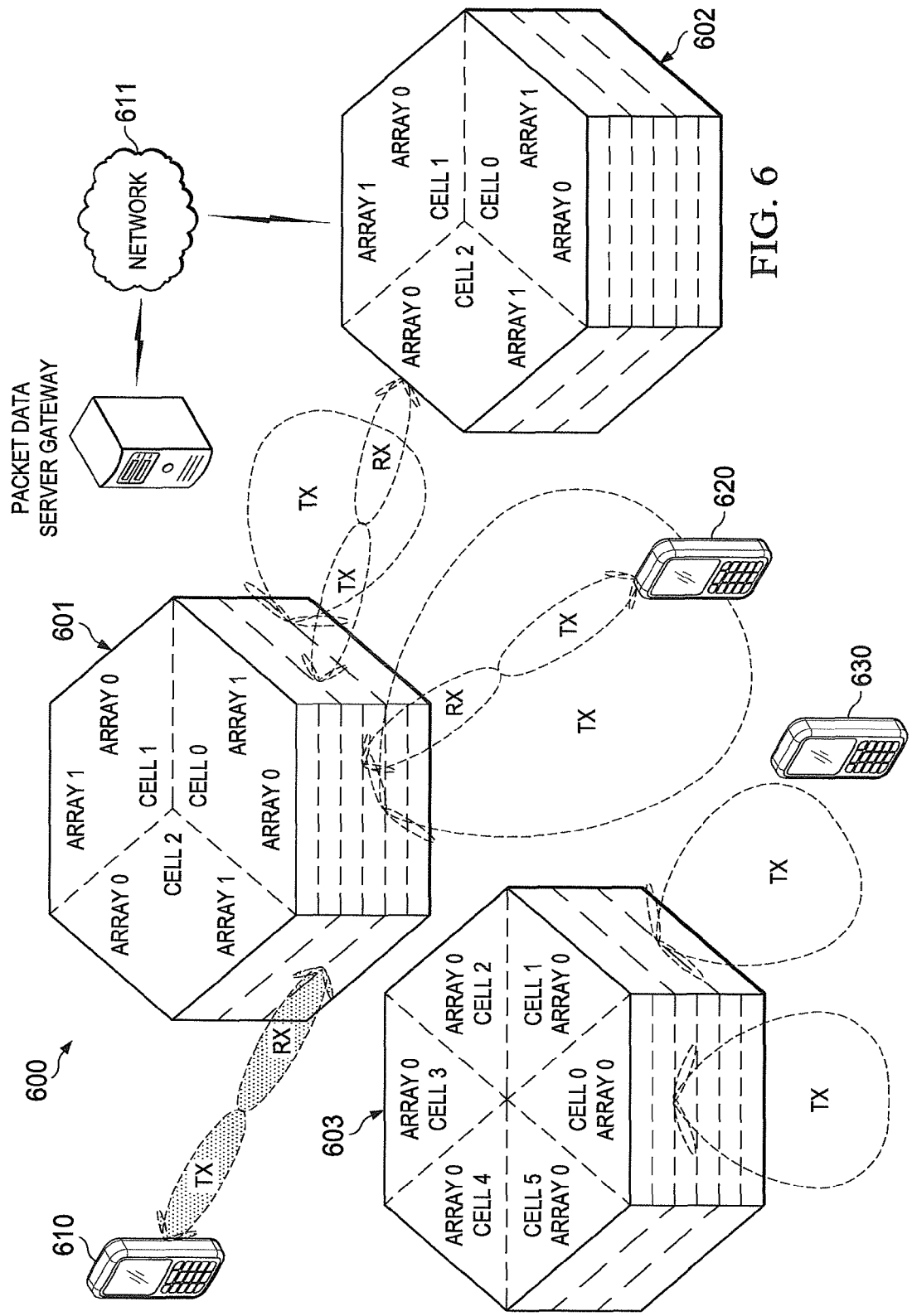
FIG. 6 illustrates a wireless communication system using antenna arrays, according to various embodiments of the present disclosure.

FIG. 6 illustrates a wireless communication system using antenna arrays, according to an embodiment of this disclosure. The embodiment of wireless communication system 600 illustrated in FIG. 6 is for illustration only. Other embodiments of the wireless communication system 600 could be used without departing from the scope of this disclosure.

As shown in FIG. 6, system 600 includes base stations 601-603 and mobile stations 610-630. Base stations 601-603 may represent one or more of base stations 101-103 of FIG. 1. Likewise, mobile stations 610-630 may represent one or more of mobile stations 111-116 of FIG. 1.

BS 601 includes three cells: cell 0, cell 1, and cell 2. Each cell includes two arrays, array 0 and array 1. In cell 0 of BS 601, antenna array 0 and array 1 may transmit the same downlink control channels on a wide beam. However, array 0 can have a different frame structure from array 1. For example, array 0 can receive uplink unicast communication from MS 620, while array 1 can transmit downlink backhaul communication with cell 2 array 0 of BS 602. BS 602 includes a wired backhaul connecting to one or more backhaul networks 611. A synchronization channel (SCH) and broadcast channel (BCH) can also be transmitted over multiple beams with a beam width not as wide as the widest transmission beam from BS 601 shown in FIG. 6. Each of these multiple beams for the SCH or BCH may have a beam width wider than beams for unicast data communication, which can be for communication between a base station and a single mobile station.

Throughout the disclosure, the transmit beams can be formed by a transmit path, such as shown in FIGS. 5A and 5B. Likewise, the receive beams can be formed by a receive path, such as shown in FIGS. 5C and 5D.

One or more of the wireless links illustrated in FIG. 6 may be broken due to an LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere can be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search a less than 180-degree elevation search may be sufficient.

Throughout the disclosure, a beam can be referred as a projection or propagating stream of energy radiation. Beamforming can by performed by applying adjustment of phase shifter and other factors to concentrate radiated energy in certain directions to transmit or receive signals. The concentrated radiation is called a spatial beam. By changing the phase shifts applied (e.g., at phase shifters 518 or 564), different spatial beams can be formed. The beam may have an identifier to uniquely identify the beam among other beams that can be formed. The beams can be wide beams or narrow beams. The beam can be of any shape, e.g., a pencil-like beam, a cone-like beam, a beam with an irregular shape with uneven amplitude in three dimensions, etc. The beams can be for data communications or for control channel communications. The communication can be from a BS to a MS, from the MS to the BS, from a BS to another BS, or from an MS to another MS, and the like.

FIG. 7A illustrates random access resource configurations according to embodiments of the present disclosure. The embodiment of the random access resource configurations shown in FIG. 7A is for illustration only. Other embodiments could be used without departing from the scope of this disclosure.

The random access configuration of the system 100 includes the Rx beamforming configuration at BS 102 and uplink time and frequency resources to be used by MS 116, for each random access opportunity. The system 100 utilizes an indexed set of random access configurations and BS 102 broadcasts the index of the random access configuration being applied.

FIG. 7A illustrates three possible examples of distribution of random access channel (RACH) opportunities over time, e.g., a first configuration 705, second configuration 710 and third configuration 715. In these examples, there are four possible BS Rx beamforming configurations. Each random access opportunity is labeled with the index of the BS Rx beamforming configuration deployed for that opportunity.

Each RACH opportunity is shown as lasting a single sub-frame. However, in certain embodiments, the RACH opportunities span several subframes. In certain embodiments, the RACH opportunities span only part of a subframe. In each RACH opportunity, MS 116 can transmit random access messages. Herein, the term RACH burst is used to describe a single transmission of a random message by MS 116. During a single RACH opportunity, MS 116 may transmit one or more RACH bursts.

If BS 102 is able to successfully decode a RACH burst from MS 116, then BS 102 is also able to determine the Tx beam or spatial configuration employed by MS 116 to transmit the corresponding RACH burst. For example, this can be achieved by including a payload in the RACH message carrying the necessary configuration or identity or by employing distinct preamble sequences for each Tx beam.

MS 116 needs to select a Tx power and Tx beamwidth for sending random access messages. It is possible that different MSs vary in their ability to form beams of different widths. In any case, each MS determines a valid set of Tx power and Tx beamwidth pairs that can be used to ensure sufficient coverage.

FIG. 7B illustrates an uplink communication according to embodiments of the present disclosure. The embodiment of the uplink communication shown in FIG. 7B is for illustration only. Other embodiments could be used without departing from the scope of this disclosure.

In certain embodiments, for a typical uplink communication with multiple antennas or with antenna array(s), UE 116 sends transmission (TX) beam to BS 102, and BS 102 uses receive (RX) beam to receive the signal from UE 116. For the communication to take place, UE's TX power plus UE's TX antenna gain minus the path loss plus the BS RX antenna gain should be no less than some threshold (e.g., based on requirement), UL_Threshold, with units for all the power or gain or loss being logarithm, e.g., dB, or dBm, or the like, such as according to Equation 1A, UE TX power+UE TX antenna gain (function of UE TX BeamWidth)−Path loss+BS RX antenna gain (BS RX BeamWidth)>=UL_Threshold (Requirement)  (1A)

The threshold based on requirement, UL_Threshold, can be the least needed value, such that BS 102 can hear from UE 116, or BS 102 can detect and decode the signal from UE 116. The UL_Threshold can also take into account of noise. For the antenna gain, it can also be called as antenna array gain if antenna array is used to form the beams. The antenna (array) gain can take into account the antenna form factor as well as gain from antenna elements. Typically when the antenna (array) gain is larger, the beamwidth of the beam formed should be narrower. When the antenna (array) gain is smaller, the beamwidth of the beam formed should be wider. The antenna (array) gain can be a function of the beamwidth, or in a normalized term, the half power beamwidth (HPBW). From another point of view, the beamwidth of the UE TX beam can also be a function of the UE TX antenna gain or antenna array. The two functions can be inverse function to each other.

In the example of uplink communication shown in FIG. 7D, UE 116 sends transmission (TX) beam 720 to BS 102. BS 102 uses receive (RX) beam 725 to receive the signal from UE 116. For the communication to take place, UE's TX power plus UE's TX antenna gain minus the path loss plus the BS RX antenna gain should be no less than some threshold (e.g., based on a requirement), with units for all the power or gain or loss being dB, or dBm, or the like. The antenna (array) gain can be a function of the beamwidth, or in a normalized term, the half power beamwidth (HPBW). Typically when the antenna (array) gain is larger, the beamwidth of the beam formed should be narrower. When the antenna (array) gain is smaller, the beamwidth of the beam formed should be wider.

In certain embodiments, MS 116 sets its initial Tx power and Tx beamwidth as a function of the random access configuration specified by BS 102 and the downlink pathloss estimate calculated by MS 116. The system 100 can employ a family of tables to specify nominal beamwidth as a function of observed downlink path loss as shown in TABLE 1.

TABLE 1

An example of the table used by the MS to determine beamwidth

| Pathloss | Nominal HPBW beamwidth |
|---|---|
| $PL \leq PL_0$ | $W_0$ |
| $PL_0 < PL \leq PL_1$ | $W_1$ |
| $PL_1 < PL \leq PL_2$ | $W_2$ |
| . | . |
| . | . |
| . | . |
| $PL_{N-1} \leq PL$ | $W_N$ |

In certain embodiments, BS 102 includes the index of the table to be used by MS 116 as part of the set of random access related parameters broadcasted by BS 102. For example, BS 102 can use the value of $P_{max}$, which is defined as the maximum allowed transmit power of MS 116, to choose an appropriate table.

When all MSs are capable of supporting every value of nominal beamwidth, MS 116 then determines its initial Tx beamwidth based on the table indicated by BS 102. MS 116 determines the initial Tx power, $P_{init}$, (in dB) according to Equation 1B:

$$P_{init}=\min(P_{max}, \text{RECEIVED\_TARGET\_POWER}+PL-\text{DIR\_GAIN}(W)+\text{POWER\_OFFSET}(W)) \quad (1B)$$

where W is the HPBW of the beam deployed by the MS, PL is the downlink path loss estimated by the MS, and DIR_GAIN is the MS specific directional gain for a beam of HPBW W. The access parameters $P_{max}$ and RECEIVED_TARGET_POWER are broadcast by BS 102 to MS 116. The term POWER_OFFSET(W) is configured by BS 102 as a function of beamwidth. For example, BS 102 can broadcast an index of a family of tables, where each table provides POWER_OFFSET as function of beamwidth used.

In certain embodiments, MSs (e.g., MS 111-MS 116 and MS 610-MS 630) vary in their ability to support different beamwidths. For this reason, MS 116 may not be able to support the nominal beamwidth specified by BS 102. The MS 116 determines the actual beamwidth to use as a function of the nominal beamwidth. Suppose W is the set of beamwidths supported by MS 116, and $W_{NB}$ is the nominal beamwidth determined as per the table specified by BS 102 and the downlink pathloss estimate. Then, in one example, the actual beamwidth $W_A$ is the smallest beamwidth that MS 116 supports, which is larger or equal to the nominal beamwidth, according to Equation 2:

$$W_A = \min\{W \in \mathcal{W}: W \geq W_{NB}\} \quad (2)$$

In another example, the actual beamwidth can be the largest beamwidth that the MS supports which is smaller or equal to the nominal beamwidth.

$$W_A = \max\{W \in \mathcal{W} : W \leq W_{NB}\} \quad (3)$$

In another example, the actual beamwidth can be the beamwidth that is closest to the nominal beamwidth.

$$W_A = \arg\min_{\{W \in \mathcal{W}\}} |W - W_{NB}| \quad (4)$$

The MS will determine the initial Tx power $P_{init}$ (in dB) as follows:

$$P_{init} = \min(P_{max}, \text{RECEIVED\_TARGET\_POWER} + \text{PL} - \text{DIR\_GAIN}(W) + \text{POWER\_OFFSET}(W) + \text{POWER\_CORR}) \quad (5)$$

where W is the HPBW of the beam deployed by MS 116, RECEIVED_TARGET_POWER is the target received power at the BS, PL is the downlink path loss estimated by MS 116, DIR_GAIN is the MS specific directional gain for a beam of HPBW W, POWER_OFFSET is the power offset configured by BS 102, POWER_CORR is the an additional power term that can be used to account for the difference between nominal and actual beamwidth. In certain embodiments, the system 100 employs a family of tables to specify the power offset as a function of the difference between nominal and actual beamwidth as shown in TABLE 2. BS 102 can include the index of the table to be used by MS 116 as part of the set of random access related parameters broadcast by BS 102.

TABLE 2

An example of the table used by the MS to determine POWER_OFFSET

| $\Delta W = W_A - W_{NB}$ | POWER_CORR |
|---|---|
| $W_0 \leq \Delta W < 0$ | $PC_0$ |
| $0 < \Delta W \leq W_1$ | $PC_1$ |
| $W_1 < \Delta W \leq W_2$ | $PC_2$ |
| $W_2 < \Delta W \leq W_3$ | $PC_3$ |
| . | . |
| . | . |
| . | . |
| $W_{N-1} \leq \Delta W$ | $PC_N$ |

In certain embodiments, BS 102 configures the maximum transmit power of MS 116 as a function of the Tx beamwidth used by MS 116. The system 100 can employ a family of tables to specify maximum Tx power as a function of Tx beamwidth as shown in TABLE 3.

TABLE 3

An example of the table used by the BS to configure maximum Tx power

| Beamwidth | $P_{max}$ |
|---|---|
| $W_0$ | $PM_0$ |
| $W_1$ | $PM_1$ |
| . | . |
| . | . |
| . | . |
| $W_M$ | $PM_M$ |

FIG. 8 illustrates staged random access retransmissions according to embodiments of the present disclosure. The embodiment of the staged random access retransmissions 800 shown in FIG. 8 is for illustration only. Other embodiments could be used without departing from the scope of this disclosure.

In certain embodiments, MS 116 transmits the random access message or preamble in multiple spatial directions. For this purpose, MS 116 divides its transmission attempts into stages. At the beginning of each stage, MS 116 will choose a value of Tx power and Tx beamwidth.

At each random access opportunity 805 advertised by BS 102, MS 116 transmits random access messages or preambles in different directions 810, using the Tx power and Tx beamwidth selected for the stage in which the RACH opportunity 805 falls.

During a particular stage, MS 116 attempts to transmit in all possible directions. MS 116 chooses a direction to transmit randomly, taking care to ensure that, as far as possible, it does not repeat a previously chosen direction. If the number of random access bursts available exceeds the number of directions for a particular Tx beamwidth in a stage, then MS 116 selects a direction that was previously chosen in the current stage. The order in which the directions are chosen can be driven by a random seed, which can be a function of the MS identity, with the aim of reducing random access collisions.

ES 102 configures the number of stages, and the duration of each stage. BS 102 broadcasts a parameter MAX_NUM_RETRANSMIT_STAGES, which is the maximum number of stages that MS 116 can use for transmitting random access messages. If random access is unsuccessful even after MAX_NUM_RETRANSMIT_STAGES stages, then MS 116 declares a random access failure to the higher layers.

The duration of each stage can be specified in several ways, such as, the number of frames, number of RACH opportunities, or number of RACH bursts. BS 102 may also vary the length of successive stages. For example, BS 102 can specify the length of the first few stages explicitly. MS 116 then uses the stage lengths provided by BS 102 for the first few specified stages and then use the value for the last specified stage or some other common value configured by BS 102 for the remaining stages (if any). Information about the stage structure can be broadcast by MS 116 in a system message or sent by BS 102 in a random access response messages that BS 102 sends when BS 102 detects a random access transmission in a RACH opportunity. The system 100 employs several preconfigured stage structures and BS 102 can indicate the index of the stage configuration to be applied. An example of possible stage configurations is provided in TABLE 4.

TABLE 4

An example of possible stage configurations

| Index | Duration | Comments |
|---|---|---|
| 0 | $T_1 = 5$ | The duration can be in units of time (ms), number of subframes etc. |
| 1 | $T_1 = 5, T_2 = 10$ | MAX_NUM_RETRANSMIT_STAGES $\geq$ 2 |
| 2 | $T_1 = 5, T_2 = 15$ | MAX_NUM_RETRANSMIT_STAGES $\geq$ 2 |
| 3 | $T_1 = 5, T_2 = 10, T_1 = 15$ | MAX_NUM_RETRANSMIT_STAGES $\geq$ 3 |

Figure 9:
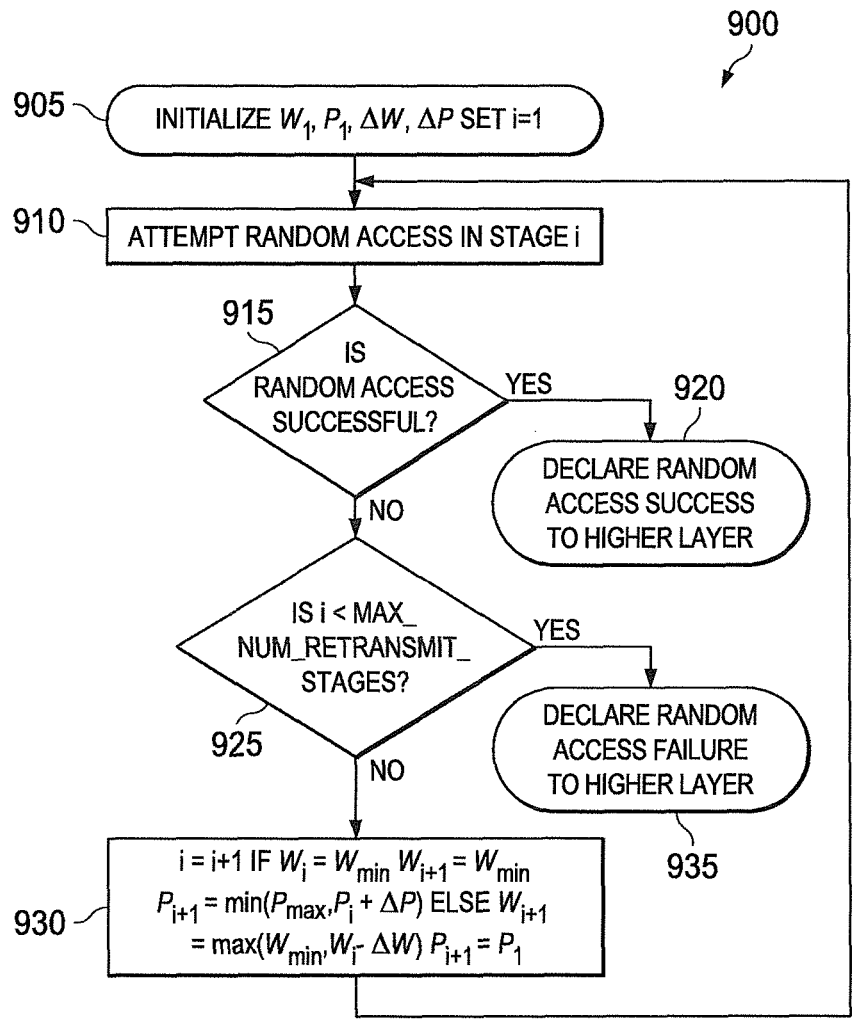
FIG. 9 illustrates a first beamwidth and power ramping, retransmission process according to embodiments of the present disclosure.

FIG. 9 illustrates a first beamwidth and power ramping, retransmission process according to embodiments of the present disclosure. The embodiment of the first beamwidth and power ramping, retransmission process (retransmission scheme 1) 900 shown in FIG. 9 is for illustration only. Other embodiments could be used without departing from the scope of this disclosure.

In certain embodiments, BS 102 enables MS 116 to employ beamwidth reduction followed by power ramping in successive random access stages. In block 905, BS 102 broadcasts a beamwidth reduction step ΔW and a power ramping step ΔP. MS 116 initializes the initial Tx power $P_1$ and Tx beamwidth $W_1$ for the initial iteration (e.g., setting i=1). MS 116 selects the initial Tx power $P_1$ and Tx beamwidth $W_1$ for stage 1. In block 910, MS 116 attempts a random access in stage i. In block 915, MS 116 determines if the random access is successful. If random access is successful in block 915, MS 116 declares the random access success to the higher layer in block 920. If random access is successful in block 915, MS 116 attempts retransmission scheme 1. In retransmission scheme 1, MS 116 decreases the Tx beamwidth in each successive stage by ΔW until the beamwidth is reduced to a minimum beamwidth $W_{min}$ supported by MS 116. MS 116 then increments the Tx power in successive stages by ΔP until the maximum power $P_{max}$ is reached. The calculation of Tx power and Tx beamwidth in stage i+1 is given according to Equations 6 and 7:

If $W_i = W_{min}$:

$$W_{i+1} = W_{min} \text{ and } P_{i+1} = \min(P_{max}, P_i + \Delta P) \tag{6}$$

Else:

$$W_{i+1} = \max(W_{min}, W_i - \Delta W) \text{ and } P_{i+1} = P_1 \tag{7}$$

As such, in block 925, MS 116 determines if a threshold number of retransmission attempts has been performed. If the threshold number of retransmission attempts has not been performed, MS 116 either decreases the Tx beamwidth or increases the Tx power in block 930 according to Equations 6 and 7 and attempts a random access for the next stage (e.g., returning to block 910). If the threshold number of retransmission attempts has been performed, MS 116 declares a random access failure to the higher layer in block 935.

BS 102 configures the value of $W_{min}$ that the MSs use. It is possible that MS 116 may not support the beamwidth computed in the retransmission scheme 1 process (such as an algorithm or plurality of instructions configured to cause the processing circuitry of MS 116 and/or BS 102 to perform this retransmission process). In that case, MS 116 can choose a beamwidth as described in an earlier embodiment or pick the next lower beamwidth. The algorithm (e.g., plurality of instructions) can be extended to the situation when BS 102 configures maximum Tx power as a function of Tx beamwidth.

Figure 10:
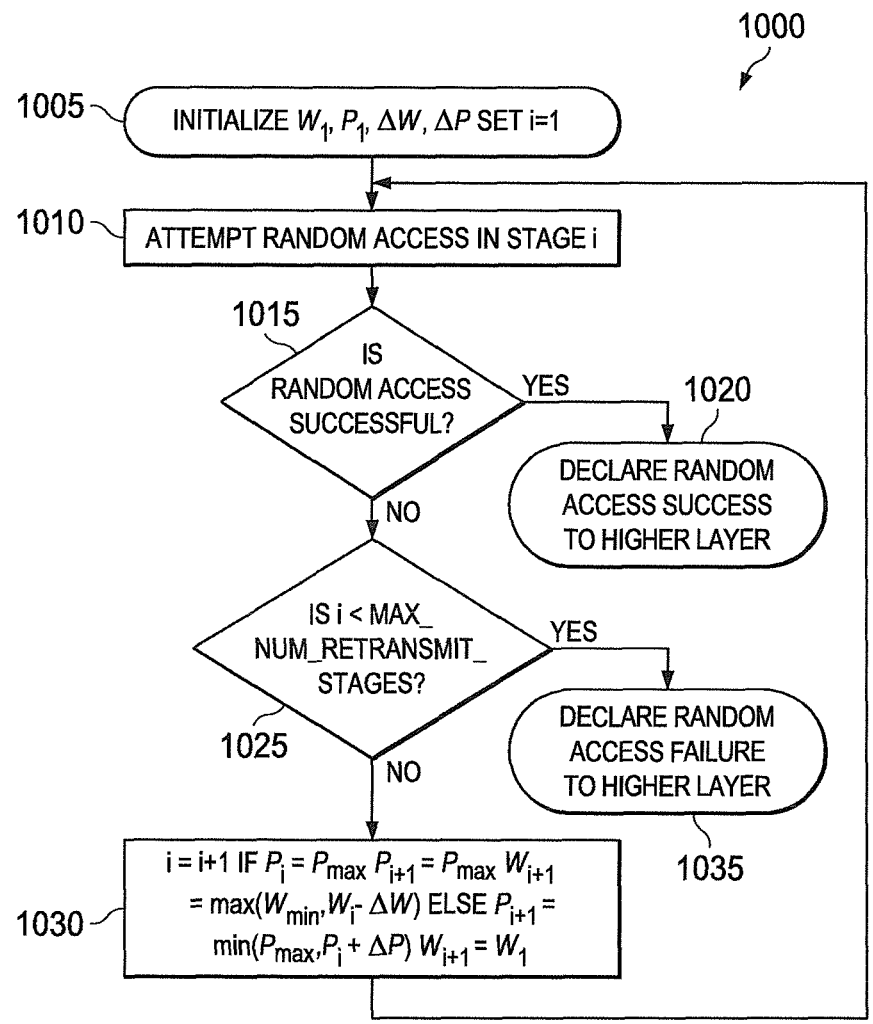
FIG. 10 illustrates a second beamwidth and power ramping, retransmission process according to embodiments of the present disclosure.

FIG. 10 illustrates a second beamwidth and power ramping, retransmission process according to embodiments of the present disclosure. The embodiment of the second beamwidth and power ramping, retransmission process (retransmission scheme 2) 1000 shown in FIG. 10 is for illustration only. Other embodiments could be used without departing from the scope of this disclosure.

BS 102 enables MS 116 to employ power ramping followed by bandwidth reduction in successive random access stages. In block 1005, BS 102 broadcasts a beamwidth reduction step ΔW and a power ramping step ΔP. MS 116 initializes the initial Tx power $P_1$ and Tx beamwidth $W_1$ for the initial iteration (e.g., setting i=1). MS 116 selects the initial Tx power $P_1$ and Tx beamwidth for initial transmission (stage 1). In block 1010, MS 116 attempts a random access in stage i. In block 1015, MS 116 determines if the random access is successful. If random access is successful in block 1015, MS 116 declares the random access success to the higher layer in block 1020. If random access is successful in block 1015, MS 116 attempts retransmission scheme 2. In this retransmission scheme (retransmission scheme 2), MS 116 increases the Tx power in each successive stage by ΔP until the maximum power $P_{max}$ is reached. MS 116 then decreases the Tx beamwidth in successive stages by ΔW until the minimum beamwidth supported by the MS is reached. The calculation of Tx power and Tx beamwidth in stage i+1 is given by Equations 8 and 9:

If $P_i = P_{max}$:

$$W_{i+1} = \max(W_{min}, W_i - \Delta W) \text{ and } P_{i+1} = P_{max} \tag{8}$$

Else:

$$W_{i+1} = W_1 \text{ and } P_{i+1} = \min(P_{max}(W_{i+1}), P_i + \Delta P) \tag{9}$$

As such, in block 1025, MS 116 determines if threshold number of retransmission attempts has been performed. If the threshold number of retransmission attempts has not been performed, MS 116 either decreases the Tx beamwidth or increases the Tx power in block 1030 according to Equations 8 and 9 and attempts a random access for the next stage (e.g., returning to block 1010). If the threshold number of retransmission attempts has been performed, MS 116 declares a random access failure to the higher layer in block 1035.

BS 102 configures the value of $P_{max}$ and $W_{min}$ that MSs use. It is possible that MS 116 may not support the beamwidth computed in the retransmission scheme 2 process (such as an algorithm or plurality of instructions configured to cause the processing circuitry of MS 116 and/or BS 102 to perform this retransmission process). In that case, MS 116 chooses a beamwidth as described in an earlier embodiment or picks the next lower beamwidth. The algorithm (plurality of instructions) can be extended to the situation when BS 102 configures maximum Tx power as a function of Tx beamwidth.

Figure 11:
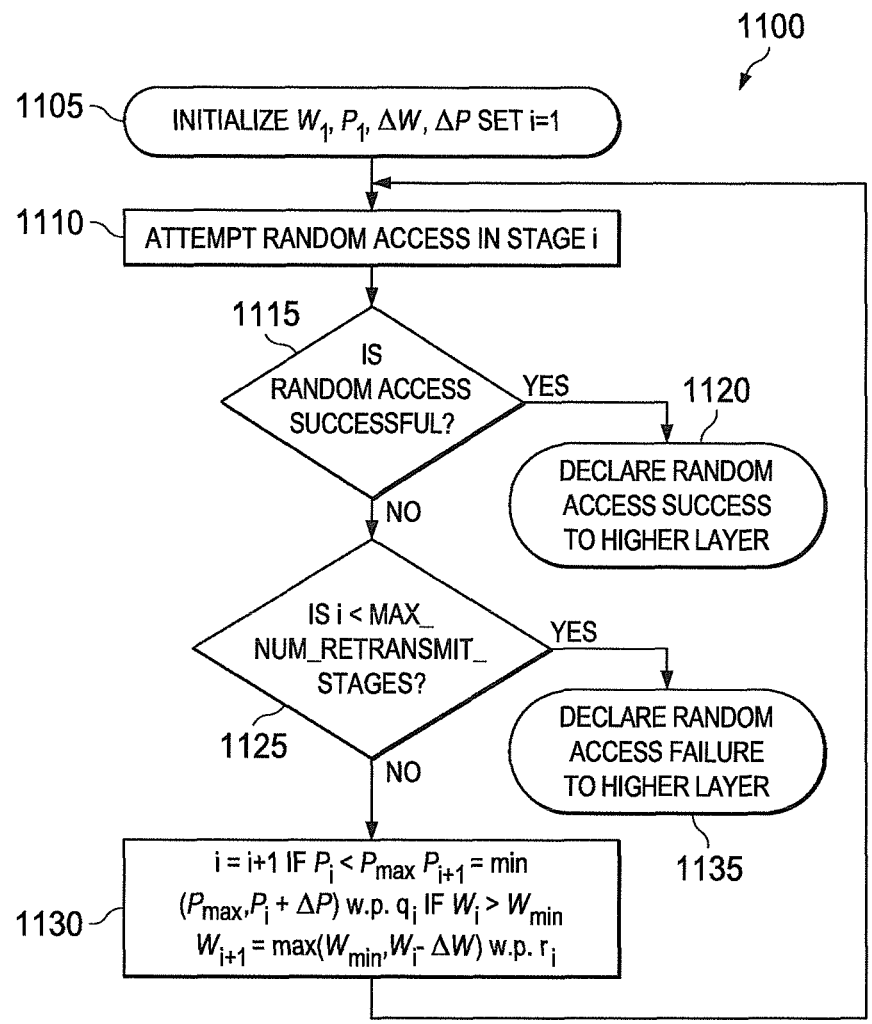
FIG. 11 illustrates a third beamwidth and power ramping, retransmission process according to embodiments of the present disclosure.

FIG. 11 illustrates a third beamwidth and power ramping, retransmission process according to embodiments of the present disclosure. The embodiment of the third beamwidth and power ramping, retransmission process (retransmission scheme 3) 1100 shown in FIG. 11 is for illustration only. Other embodiments could be used without departing from the scope of this disclosure.

In certain embodiments, BS 102 enables MS 116 to employ beamwidth reduction and power ramping in successive random access stages. In block 1105, BS 102 broadcasts a beamwidth reduction step ΔW and a power ramping step ΔP. MS 116 initializes Tx power $P_1$ and Tx beamwidth $W_1$ for the initial iteration (e.g., setting i=1). MS 116 selects the initial Tx power $P_1$ and Tx beamwidth $W_1$ for initial random access (stage 1). In block 1110, MS 116 attempts a random access in stage i. In block 1115, MS 116 determines if the random access is successful. If random access is successful in block 1115, MS 116 declares the random access success to the higher layer in block 1120. If random access is successful in block 1115, MS 116 attempts retransmission scheme 2. In this scheme (retransmission scheme 3), MS 116 probabilistically increases the Tx power and decrease the Tx beamwidth in each successive stage.

MS 116 then decreases the Tx beamwidth in successive stages by ΔW until the minimum beamwidth supported by the MS is reached. The calculation of Tx power and Tx beamwidth in stage i+1 is given by Equations 10 and 11:

If $P_i < P_{max}$:

$$P_{i+1} = \min(P_{max}, P_i + \Delta P) \text{ with probability } q_i \quad (10)$$

If $W_i > W_{min}$ $$W_{i+1} = \max(W_{min}, W_i - \Delta W) \text{ with probability } r_i \quad (11)$$

As such, in block 1125, MS 116 determines if a threshold number of retransmission attempts has been performed. If the threshold number of retransmission attempts has not been performed, MS 116 either decreases the Tx beamwidth or increases the Tx power in block 1130 according to Equations 10 and 11 and attempts a random access for the next stage (e.g., returning to block 1110). If the threshold number of retransmission attempts has been performed, MS 116 declares a random access failure to the higher layer in block 1035.

For example, MS 116 can increase the Tx power with probability $q_i$ at the end of stage i. Similarly MS 116 can decrease the beamwidth by probability $r_i$ at the end of stage i. In certain embodiments, more sophisticated strategies are utilized. For example, certain strategies involve decreasing Tx power and increasing Tx beamwidth. BS 102 configures the value of $P_{max}$ and $W_{min}$ that MSs use. BS 102 configures the values of $q_i$ and $r_i$ to be used by the MSs. It is possible that the MS may not support the beamwidth computed by the algorithm provided in scheme 3 (i.e. computed by the plurality of instructions). In that case, MS 116 chooses a beamwidth as described in an earlier embodiment or picks the next lower beamwidth. The algorithm (i.e., plurality of instructions) can be extended to the situation when BS 102 configures maximum Tx power as a function of Tx beamwidth.

In certain embodiments, BS 102 restricts some combinations of transmit power and transmit beamwidth to ensure sufficient coverage. In one approach, MS 116 determines the initial Tx beamwidth and Tx power based on one of the above techniques (e.g., above embodiments). BS 102 configures a minimum power offset beyond the initial Tx power that MS 116 needs to apply in order to use a wider Tx beamwidth as a function of the difference between the initial Tx beamwidth and proposed Tx beamwidth, as exemplified in Table 5:

TABLE 5

An example of minimum power offset specification

| ΔW = W − $W_{init}$ | MIMIMUM_POWER_OFFSET |
|---|---|
| 0 < ΔW ≤ $W_1$ | $MPO_1$ |
| $W_1$ < ΔW ≤ $W_2$ | $MPO_2$ |
| . | . |
| . | . |
| $W_{K-1}$ ≤ ΔW | $MPO_k$ |

Figure 12:
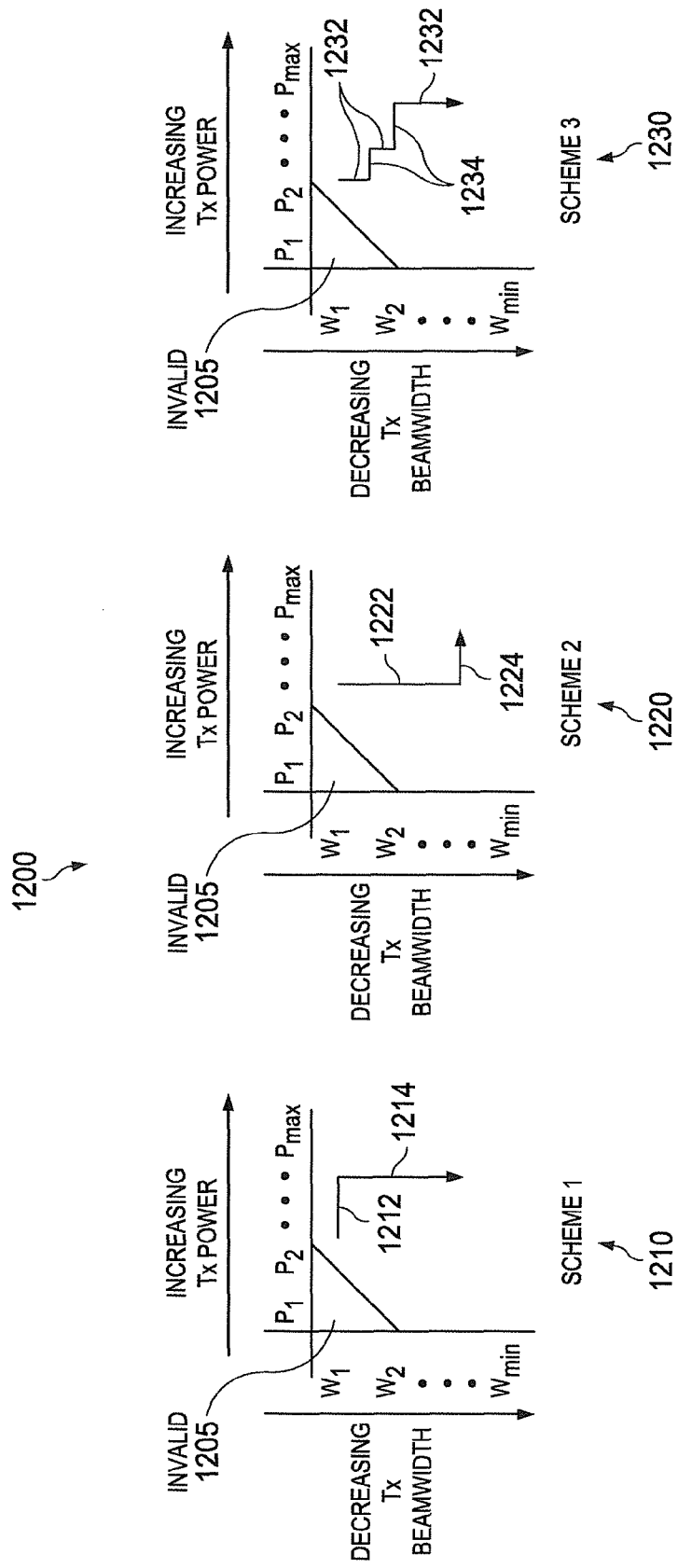
FIG. 12, illustrates first, second and third retransmission schemes according to embodiments of the present disclosure.

FIG. 12 illustrates first, second and third retransmission schemes according to embodiments of the present disclosure. The embodiments of the retransmission schemes 1200 shown in FIG. 12 are for illustration only. Other embodiments could be used without departing from the scope of this disclosure.

A graphical illustration of the three retransmission schemes discussed above is shown in FIG. 12. In FIG. 12, some combinations of Tx power and Tx beamwidth that are marked invalid refer to those pairs that do not satisfy the conditions described in this disclosure. For example, invalid regions 1205 identify Tx power and Tx beamwidth combinations in which the Tx power is too low and the TX beamwidth is too wide to accomplish a successful random access.

In retransmission scheme-1 1210, if random access is not successful, MS 116 attempts a retransmission by first boosting its Tx power 1212 by ΔP in successive iterations until either random access is achieved or until a threshold level $P_{max}$ is reached. The threshold Tx power level can be a maximum power level or some predetermined or specified power level. Thereafter, if random access still has not been achieved, MS 116 decreases its Tx beamwidth 1214 by ΔW in successive iterations until either random access is achieved or until a threshold level $W_{min}$ is reached. The threshold Tx beamwidth level can be a minimum beamwidth level or some predetermined or specified beamwidth level.

In retransmission scheme-2 1220, if random access is not successful, MS 116 attempts a retransmission by first decreasing its beamwidth 1222 by ΔW in successive iterations until either random access is achieved or until a threshold level $W_{min}$ is reached. The threshold Tx beamwidth level can be a minimum beamwidth level or some predetermined or specified beamwidth level. Thereafter, if random access still has not been achieved, MS 116 boosts its Tx power 1224 by ΔP in successive iterations until either random access is achieved or until a threshold level $P_{max}$ is reached. The threshold Tx power level can be a maximum power level or some predetermined or specified power level. Thereafter, if random access still has not been achieved, MS 116.

In retransmission scheme-3 1230, if random access is not successful, MS 116 attempts a retransmission by boosting its Tx Power and decreasing its Tx beamwidth in successive iterations. For example, in a first retransmission attempt, MS 116 decreases its Tx beamwidth 1232. If random access is not successful, MS 116 boosts its Tx power 1234 and re-attempts random access. MS 116 continues to decrease its Tx beamwidth 1232 by ΔW and boost its Tx power level 1234 by ΔP in successive iterations until either random access is achieved, until a threshold level $W_{min}$ is reached, or until a threshold level $P_{max}$ is reached.

Figure 13:
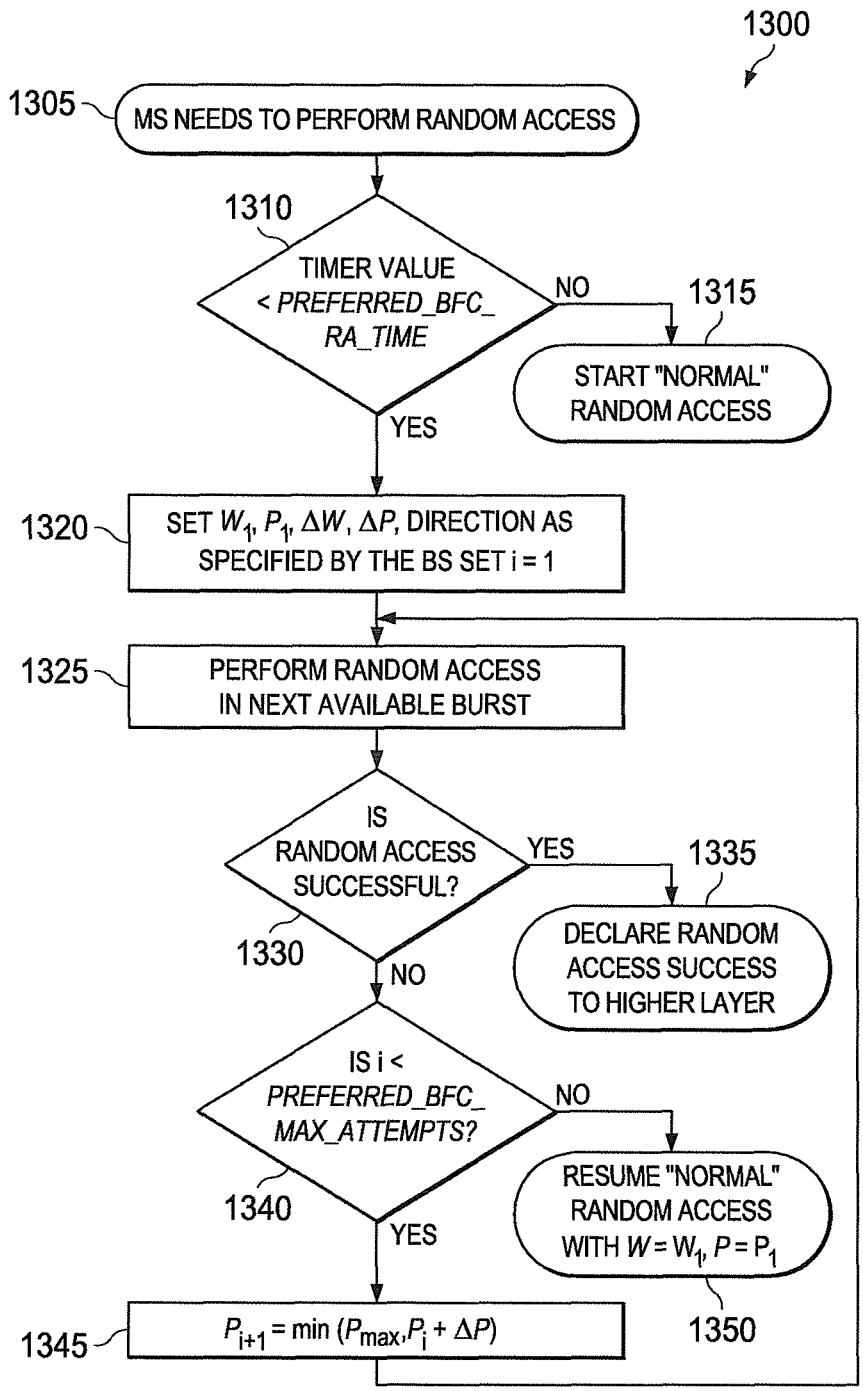
FIG. 13 illustrates a BS optimized random access according to embodiments of the present disclosure.

FIG. 13 illustrates a BS optimized random access according to embodiments of the present disclosure. The embodiment of the BS optimized random access 1300 shown in FIG. 13 is for illustration only. Other embodiments could be used without departing from the scope of this disclosure.

In certain embodiments, after MS 116 has successfully executed a random access procedure, BS 102 instructs MS 116 to use a preferred Rx and Tx beamforming configuration for future random access attempts. This configuration includes the BS Rx beamforming configuration, MS Tx beam, Tx power, Tx beamwidth, and Tx spatial orientation. The preferred Rx and Tx beamforming configuration (also referenced as a BS optimized random access) provides a reduction in random access latency once MS 116 and BS 102 have discovered a working Rx-Tx combination. In one example, the preferred beamforming configuration could be the configuration used for the previously successful random access attempt. In another example, the preferred beamforming configuration could be a different configuration discovered when MS 116 is in a connected state involving uplink data transmissions.

In certain embodiments, BS 102 includes a value for a timer, such as PREFERRED_BFC_RA_TIME, which indicates the time for which the random access configuration specified by BS 102 is valid after receipt of the message from BS 102. The value of this timer can depend on an estimate by BS 102 of a mobility of MS 116 obtained either directly from MS 116 or via indirect measurements, such as channel state reports. In certain embodiments, BS 102 includes a maximum attempt parameter, such as PREFERRED_BFC_MAX_ATTEMPTS, which is the maximum number for RACH burst attempts for which MS 116 will use the preferred beamforming configuration. BS 102 can configure MS 116 to employ power ramping after each unsuccessful random access attempt. Once MS 116 runs out of the allowed PREFERRED_BFC_MAX_ATTEMPTS, MS 116 can resume the normal random access procedure described in the techniques outlined herein above with respect to FIGS. 7 through 12.

FIG. 13 illustrates a process for the ES optimized random access according to embodiments of the present disclosure. In block 1305, MS 116 starts a random access procedure. In block 1310, MS 116 determines if a timer value exceeds a threshold time value, such as PREFERRED_BFC_RA_TIME. If the timer value is exceeds the threshold value (i.e., timer>PREFERRED_BFC_RA_TIME), MS 116 performs random access using a normal random access procedure in block 1315. If the timer value is less than the threshold value (i.e., timer<PREFERRED_BFC_RA_TIME, MS 116 sets $W_1$, $P_1$, $\Delta W$, $\Delta P$ and direction as specified by the ES, and initializes i=1 in block 1320. MS 116 performs random access in the next available burst in block 1325. In block 1330, MS 116 determines if random access was successful. If random access is successful, MS 116 declares random access success to the higher layer in block 1335. If random access is unsuccessful, in block 1340, MS 116 determines if i exceeds a threshold number of iterations (i.e., i<PREFERRED_BFC_MAX_ATTEMPTS. If the number of iterations is less than the threshold amount (i.e., i<PREFERRED_BFC_MAX$_{ATTEMPTS}$ is true or "yes"), MS 116 adjusts its power level in block 1345 and attempts random access in the next available burst in block 1325. If the number of iterations exceeds the threshold amount (i.e., i<PREFERRED_BFC_MAX$_{ATTEMPTS}$ is not true or "no"), MS 116 proceeds to perform normal random access in block 1350 with sets $W=W_1$ and $P=P_i$.

Figure 14:
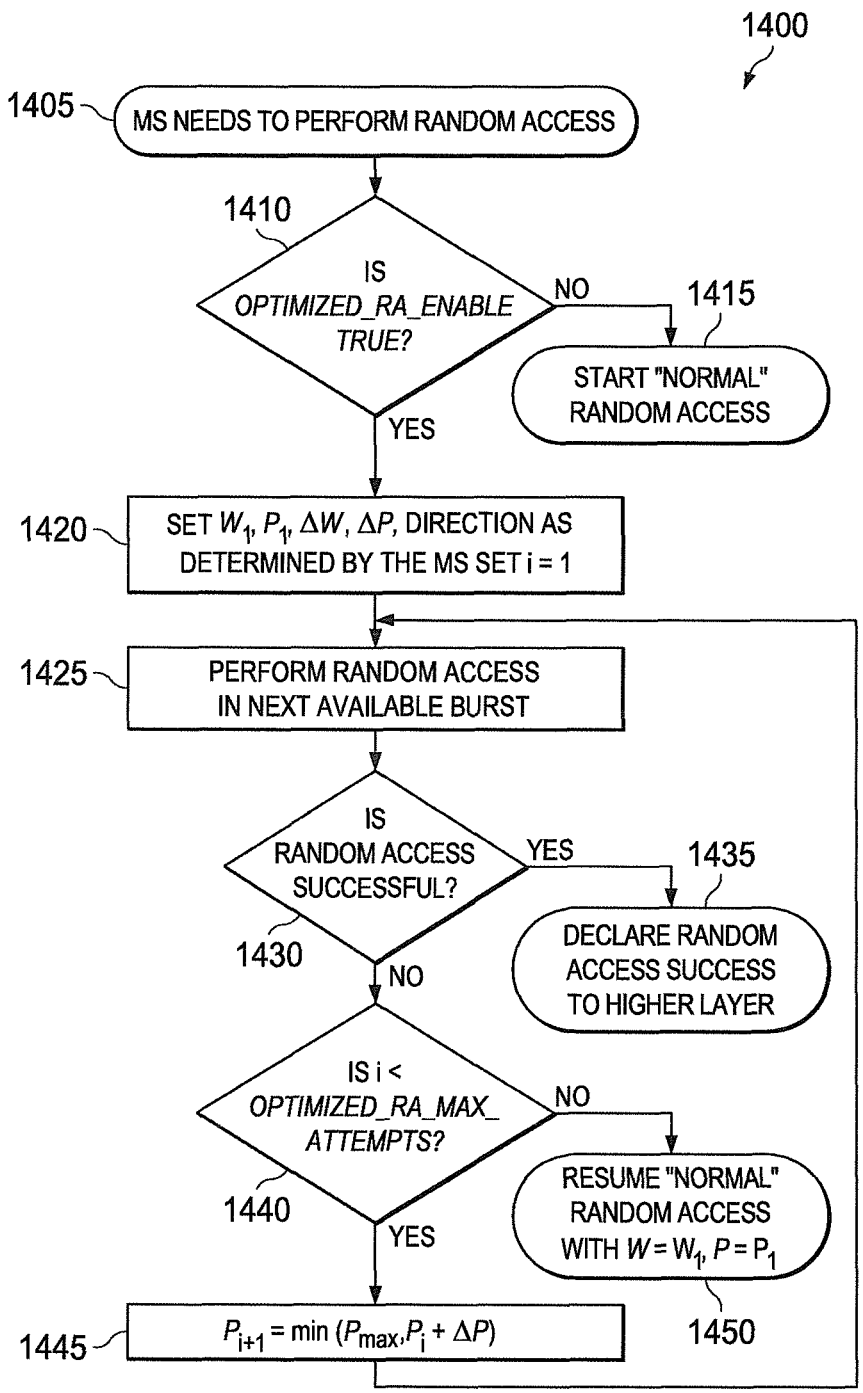
FIG. 14 illustrates a MS optimized random access according to embodiments of the present disclosure.

FIG. 14 illustrates a MS optimized random access according to embodiments of the present disclosure. The embodiment of the MS optimized random access 1400 shown in FIG. 14 is for illustration only. Other embodiments could be used without departing from the scope of this disclosure In certain embodiments, after MS 116 has successfully executed a random access procedure, MS 116 stores (internally in memory 360) a random access beamforming configuration for future random access attempts. This configuration includes the BS Rx beamforming configuration, MS Tx beam, Tx power, Tx beamwidth, and Tx spatial orientation. By storing the random access beamforming configuration, MS 116 is configured to reduce random access latency once MS 116 and BS 102 have discovered a working Rx-Tx combination. In one example, the preferred beamforming configuration could be the one used for the previously successful random access attempt. In another example, the preferred beamforming configuration could be a different configuration discovered when MS 116 is in a connected state involving uplink data transmissions. In another example, the preferred beamforming configuration could be based on downlink measurements of Tx beams.

BS 102 configures MS 116 to use its preferred random access configuration via an optimized configuration parameter OPTIMIZED_RA_ENABLE. If enabled, BS 102 includes a threshold attempt parameter OPTIMIZED_RA_MAX_ATTEMPTS, which is the maximum number for RACH burst attempts for which MS 116 will use the preferred beamforming configuration. In certain embodiments, BS 102 configures MS 116 to employ power ramping after each unsuccessful random access attempt. Once MS 116 runs out of the allowed OPTIMIZED_RA_ATTEMPTS, MS 116 resumes the normal random access procedure described in the techniques outlined herein above with respect to FIGS. 7 through 12.

FIG. 14 illustrates a process for the MS optimized random access according to embodiments of the present disclosure. In block 1405, MS 116 starts a random access procedure. In block 1410, MS 116 determines if optimized configuration parameter OPTIMIZED_RA_ENABLE is enabled. If the optimized configuration parameter OPTIMIZED_RA_ENABLE not enabled (i.e., "no"), MS 116 performs random access using a normal random access procedure in block 1415. If the optimized configuration parameter OPTIMIZED_RA_ENABLE enabled (i.e., "yes"), MS 116 sets $W_1$, $P_1$, $\Delta W$, $\Delta P$ and direction as specified by BS 120, and initializes i=1 in block 1420. MS 116 performs random access in the next available burst in block 1425. In block 1430, MS 116 determines if random access was successful. If random access is successful, MS 116 declares random access success to the higher layer in block 1435. If random access is unsuccessful, in block 1440, MS 116 determines if i exceeds a threshold number of iterations i<OPTIMIZED_RA_MAX_ATTEMPTS. If the number of iterations is less than the threshold amount (i.e., i<OPTIMIZED_RA_MAX_ATTEMPTS is true or "yes"), MS 116 adjusts its power level in block 1445 and attempts random access in the next available burst in block 1425. If the number of iterations exceeds the threshold amount (i.e., i<OPTIMIZED_RA_MAX_ATTEMPTS is not true or "no"), MS 116 proceeds to perform normal random access in block 1450 with sets $W=W_1$ and $P=P_i$.

In certain embodiments, BS 102 transmits downlink broadcast channels (e.g., shared channel (SCH) and broadcast channel (BCH)) and/or reference signals using multiple Tx beams. MS 116 measures signal quality (e.g., received signal strength or signal to noise ratio) of these Tx beams and identifies one or more Tx beams/directions with acceptable quality. MS 116 then attempts to transmit its random access message in these directions preferentially. In certain embodiments, this involves adding a fixed angular offset depending on the relative positing of Tx and Rx antenna arrays (if separate antenna arrays are being used for Tx and Rx purposes). For example, in a RACH opportunity, MS 116 can pick these directions first before selecting other directions. In another example, MS 116 assigns higher probability of picking these beams.

In certain embodiments, MS 116 has access to multiple digital chains enabling MS 116 to transmit multiple random access messages simultaneously. This approach can be used to reduce latency by exercising multiple spatial directions. MS 116 ensures that the directions selected for simultaneous transmission are sufficiently separate to avoid self-interference. A disadvantage of this approach is the increased interference caused due to multiple transmissions and the resulting unfairness for MSs that have only a single digital chain at their disposal. To mitigate this effect, in certain embodiments, BS 102 requests that MS 116 reduce its Tx power by a value POWER_RED_OFFSET (in dB) as a function of the number of digital chains being used. An example is provided in TABLE 6.

TABLE 6

An example of the table used by the MS to determine POWER_RED_OFFSET

| Number of simultaneous RACH attempts | POWER_RED_OFFSET |
|---|---|
| 2 | $PR_2$ |
| 3 | $PR_3$ |
| . | . |
| . | . |
| . | . |
| N | $PR_N$ |

In certain embodiments, BS 102 configures MS 116 to use fewer RACH opportunities. For example, if MS 116 has N digital chains, then BS 102 can restrict MS 116 to only use every MULT_CYCLE$^{th}$ RACH opportunity. An example is provided in TABLE 7.

TABLE 7

An example of the table used by the MS to determine MULT_CYCLE

| Number of simultaneous RACH attempts | MULT_CYCLE |
|---|---|
| 2 | 2 |
| 3 | 2 |
| . | . |
| . | . |
| . | . |
| N | k |

In certain embodiments, BS 102 specifies a different set of random access parameters (e.g., RECEIVED_TARGET_POWER, index of table to determine beamwidth as a function of pathloss, index of table to determine power offset as a function of nominal and actual beamwidths, backoff parameters, stage configuration, $P_{max}$, $W_{min}$, PREFERRED_BFC_RA_TIME, PREFERRED_BFC_MAX_ATTEMPTS, POWER_RED_OFFSET, and MULT_CYCLE) for each advertised Rx beamforming configuration. MS 116 maintains separate state machines for the purposes of random access for each BS Rx beamforming configuration.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile station comprising:
a plurality of antennas configured to communicate with at least one base station; and
a processing circuitry coupled to the plurality of antennas, the processing circuitry configured to perform a random access during a random access channel (RACH) burst, wherein the processing circuitry is configured to:
transmit a random access signal as a function of an initial transmit (Tx) beamwidth and an initial Tx power,
in response to a random access attempt failure, change a Tx beamwidth and Tx power and retransmit the random access signal with an adjusted Tx beamwidth and an adjusted Tx power, where at least one of:
the adjusted Tx beamwidth is smaller than the initial Tx beamwidth, or
the adjusted Tx power is greater than the initial Tx power, and
at least one of:
in response to achieving the minimum Tx beamwidth, the processing circuitry is configured to boost a Tx power level by a ΔP in successive iterations until the random access is successful or a maximum Tx power level, $P_{max}$, is achieved; or
in response to achieving the maximum Tx power level, the processing circuitry is configured to decrease the Tx beamwidth by a ΔW in successive iterations until the random access is successful or the minimum Tx beamwidth, $W_{min}$, is achieved.

2. The mobile station as set forth in claim 1, wherein the mobile station is configured to receive a configuration from the at least one base station, wherein the configuration can include at least one of:
a mapping from a path loss to at least one of:
an initial Tx beamwidth ($W_1$),
an initial Tx power level ($P_1$),
a Tx beamwidth for a retransmission,
a Tx power level for a retransmission,
an adjusted Tx beamwidth ΔW for a retransmission, or
an adjusted Tx power level ΔP for a retransmission,
wherein the path is in-between the mobile station and the base station and the path loss can be measured and estimated by the mobile station;
a mapping from a set of beamwidth that the mobile station is capable to support to at least one of:
an initial Tx power level ($P_1$),
a Tx power level for a retransmission, or
an adjusted Tx power level ΔP for a retransmission;
an initial Tx beamwidth ($W_1$);
an initial Tx power level ($P_1$);
a Tx beamwidth for a retransmission;
a Tx power level for a retransmission;
an adjusted Tx beamwidth ΔW for a retransmission; or
an adjusted Tx power level ΔP for a retransmission.

3. The mobile station as set forth in claim 1, wherein the processing circuitry is configured to set at least an initial Tx beamwidth ($W_1$) and an initial Tx power level ($F_1$), as a function of at least one of:
a path loss of a path in-between the mobile station and the base station, wherein the path loss can be measured and estimated by the mobile station; or
a set of beamwidth that the mobile station is capable to support.

4. The mobile station as set forth in claim 1, wherein the processing circuitry is configured to at least one of:
decrease the Tx beamwidth by a ΔW in successive iterations until the random access is successful or a minimum Tx beamwidth, $W_{min}$, is achieved, or
boost the Tx power level by a ΔP in successive iterations until the random access is successful or the maximum Tx power level, $P_{max}$, is achieved.

5. The mobile station as set forth in claim 1, wherein the processing circuitry is configured to alternate between decreasing the Tx beamwidth by the ΔW and boosting the Tx power level by the ΔP in successive iterations until at least one of:

the random access is successful; or the minimum Tx beamwidth, $W_{min}$, and the maximum Tx power level, $P_{max}$, is achieved.

6. The mobile station as set forth in claim 1, wherein the processing circuitry is configured to utilize a preferred random access configuration, the preferred random access configuration comprising at least one of:

an initial Tx beamwidth ($W_1$), an initial Tx power level ($P_1$), a specified $\Delta W$, a specified $\Delta P$, and a direction determined by the at least one base station;

the initial Tx beamwidth ($W_1$), the initial Tx power level ($P_1$), the $\Delta W$, the $\Delta P$, and a direction determined by the processing circuitry; or values for the initial Tx beamwidth ($W_1$), the initial Tx power level ($P_1$), the $\Delta W$, the $\Delta P$, and the direction based on a configuration discovered when in a connected state involving uplink data transmissions.

7. A method for performing random access, the method comprising:

attempting, by a mobile station, a random access of at least one base station, during a random access channel (RACH) burst;

transmitting a random access signal as a function of an initial transmit (Tx) beamwidth and an initial Tx power, and in response to a random access attempt failure, changing a Tx beamwidth and Tx power and retransmitting the random access signal with an adjusted Tx beamwidth and an adjusted Tx power, where at least one of:

the adjusted Tx beamwidth is smaller than the initial Tx beamwidth, or the adjusted Tx power is greater than the initial Tx power, wherein changing a Tx beamwidth and Tx power comprises at least one of:

in response to achieving the minimum Tx beamwidth, boosting a Tx power level by a $\Delta P$ in successive iterations until the random access is successful or a maximum Tx power level, $P_{max}$, is achieved; or in response to achieving the maximum Tx power level, decreasing the Tx beamwidth by the $\Delta W$ in successive iterations until the random access is successful or the minimum Tx beamwidth, $W_{min}$, is achieved.

8. The method as set forth in claim 7, further comprising receiving a configuration from the at least one base station, wherein the configuration can include at least one of:

a mapping from a path loss to at least one of:
an initial Tx beamwidth ($W_1$),
an initial Tx power level ($P_1$),
a Tx beamwidth for a retransmission,
a Tx power level for a retransmission,
an adjusted Tx beamwidth $\Delta W$ for a retransmission, or
an adjusted Tx power level $\Delta P$ for a retransmission,
wherein the path is in-between the mobile station and the base station and the path loss can be measured and estimated by the mobile station;

a mapping from a set of beamwidth that the mobile station is capable to support to at least one of:
an initial Tx power level ($P_1$), a Tx power level for a retransmission, or an adjusted Tx power level $\Delta P$ for a retransmission;
an initial Tx beamwidth ($W_1$);
an initial Tx power level ($P_1$);
a Tx beamwidth for a retransmission;
a Tx power level for a retransmission;
an adjusted Tx beamwidth $\Delta W$ for a retransmission; or
an adjusted Tx power level $\Delta P$ for a retransmission.

9. The method as set forth in claim 7, further comprising setting at least an initial Tx beamwidth ($W_1$), an initial Tx power level ($P_1$), as a function of at least one of a path loss of the path in-between the mobile station and the base station wherein the path loss can be measured and estimated by the mobile station; or a set of beamwidth that the mobile station is capable to support.

10. The method as set forth in claim 7, wherein changing comprises at least one of:

decreasing the Tx beamwidth by a $\Delta W$ in successive iterations until the random access is successful or a minimum Tx beamwidth, $W_{min}$, is achieved, or boosting the Tx power level by the $\Delta P$ in successive iterations until the random access is successful or the maximum Tx power level, $P_{max}$, is achieved.

11. The method as set forth in claim 7, wherein changing comprises alternating between decreasing the Tx beamwidth by the $\Delta W$ and boosting the Tx power level by the $\Delta P$ in successive iterations until at least one of:

the random access is successful; or the minimum Tx beamwidth, $W_{min}$, and the maximum Tx power level, $P_{max}$, is achieved.

12. The method as set forth in claim 7, further comprising utilizing a preferred random access configuration, the preferred random access configuration comprising at least one of:

an initial Tx beamwidth ($W_1$), an initial Tx power level ($P_1$), a specified $\Delta W$, a specified $\Delta P$, and a direction determined by the at least one base station;

the initial Tx beamwidth ($W_1$), the initial Tx power level ($F_1$), the $\Delta W$, the $\Delta P$, and a direction determined by the mobile station; or values for the initial Tx beamwidth ($W_1$), the initial Tx power level ($P_1$), the $\Delta W$, the $\Delta P$, and the direction based on a configuration discovered when in a connected state involving uplink data transmissions.

13. A base station comprising:

a plurality of antenna configured to communicate with at least one mobile station;

processing circuitry coupled to the plurality of antennas, the processing circuitry configured to:

enable the at least one mobile station to perform a random access during a random access channel (RACH) burst, receive a random access signal from the at least one mobile station, wherein the random access signal is transmitted from the at least one mobile station at an initial transmit (Tx) beamwidth and an initial Tx power, in response to a random access attempt failure, receive a retransmission of the random access signal in which a Tx beamwidth and Tx power are changed to an adjusted Tx beamwidth and an adjusted Tx power, where at least one of:

the adjusted Tx beamwidth is smaller than the initial Tx beamwidth, or the adjusted Tx power is greater than the initial Tx power, and at least one of:

in response to achieving the minimum Tx beamwidth, a Tx power level is boosted by a $\Delta P$ in successive iterations until the random access is successful or a maximum Tx power level, $P_{max}$, is achieved; or in response to achieving the maximum Tx power level, the Tx beamwidth is decreased by a $\Delta W$ in successive iterations until the random access is successful or the minimum Tx beamwidth, $W_{min}$, is achieved.

14. The base station as set forth in claim 13, wherein the processing circuitry configured is configured to transmit a configuration to the at least one mobile station, wherein the configuration can include at least one of:
 a mapping from a path loss to at least one of:
  an initial Tx beamwidth ($W_1$),
  an initial Tx power level ($P_1$),
  a Tx beamwidth for a retransmission,
  a Tx power level for a retransmission,
  an adjusted Tx beamwidth $\Delta W$ for a retransmission, or
  an adjusted Tx power level $\Delta P$ for a retransmission,
 wherein the path is in-between the mobile station and the base station and the path loss can be measured and estimated by the mobile station;
 a mapping from a set of beamwidth that the mobile station is capable to support to at least one of:
  an initial Tx power level ($P_1$), a Tx power level for a retransmission, or an adjusted Tx power level $\Delta P$ for a retransmission;
  an initial Tx beamwidth ($W_1$);
  an initial Tx power level ($P_1$);
  a Tx beamwidth for a retransmission;
  a Tx power level for a retransmission;
  an adjusted Tx beamwidth $\Delta W$ for a retransmission; or
  an adjusted Tx power level $\Delta P$ for a retransmission.

15. The base station as set forth in claim 13, wherein the at least one mobile station is configured to set at least an initial Tx beamwidth ($W_1$), an initial Tx power level ($P_1$), can be a function of at least one of:
 a path loss of the path in-between the mobile station and the base station wherein the path loss can be measured and estimated by the mobile station; or
 a set of beamwidth that the mobile station is capable to support.

16. The base station as set forth in claim 13, wherein the at least one mobile station is configured to at least one of:
 decrease a Tx beamwidth by a $\Delta W$ in successive iterations until the random access is successful or a minimum Tx beamwidth, $W_{min}$, is achieved; or
 boost a Tx power level by a $\Delta P$ in successive iterations until the random access is successful or the maximum Tx power level, $P_{max}$, is achieved.

17. The base station as set forth in claim 13, wherein the mobile station is configured to alternate between decreasing the Tx beamwidth by a $\Delta W$ and boosting the Tx power level by a $\Delta P$ in successive iterations until at least one of:
 the random access is successful; or
 the minimum Tx beamwidth, $W_{min}$, and the maximum Tx power level, $P_{max}$, is achieved.

18. The base station as set forth in claim 13, wherein the processing circuitry is configured to cause the mobile station to utilize a preferred random access configuration, the preferred random access configuration comprising at least one of:
 an initial Tx beamwidth ($W_1$), an initial Tx power level ($P_1$), a specified $\Delta W$, a specified $\Delta P$, and a direction determined by the at least one base station;
 the initial Tx beamwidth ($W_1$), the initial Tx power level ($P_1$), the $\Delta W$, the $\Delta P$, and a direction determined by the processing circuitry; or
 values for the initial Tx beamwidth ($W_1$), the initial Tx power level ($P_1$), the $\Delta W$, the $\Delta P$, and the direction based on a configuration discovered when in a connected state involving uplink data transmissions.

* * * * *